US012604230B2

(12) United States Patent
Esswie

(10) Patent No.: US 12,604,230 B2
(45) Date of Patent: Apr. 14, 2026

(54) ADAPTIVE CONFIGURED GRANT SCHEDULING

(71) Applicant: Dell Products, L.P., Round Rock, TX (US)

(72) Inventor: Ali Esswie, Calgary (CA)

(73) Assignee: Dell Products L.P., Round Rock, TX (US)

( * ) Notice: Subject to any disclaimer, the term of this patent is extended or adjusted under 35 U.S.C. 154(b) by 275 days.

(21) Appl. No.: 18/331,814

(22) Filed: Jun. 8, 2023

(65) Prior Publication Data

US 2024/0414581 A1     Dec. 12, 2024

(51) Int. Cl.
*H04W 28/02* (2009.01)
*H04W 52/02* (2009.01)
(Continued)

(52) U.S. Cl.
CPC ... *H04W 28/0221* (2013.01); *H04W 52/0216* (2013.01); *H04W 72/121* (2013.01); *H04W 72/543* (2023.01)

(58) Field of Classification Search
CPC ......... H04W 28/0221; H04W 52/0216; H04W 72/121; H04W 72/543; H04W 74/0833;
(Continued)

(56) References Cited

U.S. PATENT DOCUMENTS

2021/0315000 A1* 10/2021 Li ......................... H04W 72/21
2023/0354188 A1* 11/2023 Akl ....................... H04W 76/28
(Continued)

FOREIGN PATENT DOCUMENTS

WO     2023/004771     2/2023
WO     2023/019373     2/2023
WO     2023/096562     6/2023

OTHER PUBLICATIONS

3GPP TSG-RAN2#121-bis electronic; R2-2303653; Source: Lenovo; Title: Alignment to Cell DRX and cell DTX; Apr. 17-26, 2023. (Year: 2023).*

(Continued)

*Primary Examiner* — Mohammed S Chowdhury
(74) *Attorney, Agent, or Firm* — Amin, Turocy & Watson, LLP

(57) ABSTRACT

A radio access network node configured for DRX off mode operation may schedule configured grants for a user equipment to occur during one or more DRX OFF mode periods. The node may transmit to one or more user equipment a configured grant activation configuration indicative of a configured grant control channel resource to be available during discontinuous reception OFF periods. The configured grant activation configuration may comprise a scrambling code corresponding to a user equipment usable by the user equipment to receive updates to the configured grant activation configuration. The user equipment may request, via a configured grant activation control channel resource configured by the configured grant activation configuration, over-riding of a DRX OFF period to activate one or more scheduled configured grant occasions that overlap one or more DRX OFF periods. The user equipment may transmit uplink traffic to the node via one or more activated configured grant occasions.

20 Claims, 14 Drawing Sheets

(51) Int. Cl.
  *H04W 72/121* (2023.01)
  *H04W 72/543* (2023.01)

(58) Field of Classification Search
  CPC ........... H04W 52/0203; H04W 72/115; H04W 28/0268; H04W 52/0229; H04W 76/28
  See application file for complete search history.

(56) References Cited

U.S. PATENT DOCUMENTS

| | | | |
|---|---|---|---|
| 2024/0057206 A1* | 2/2024 | Sakhnini | H04W 72/23 |
| 2024/0073987 A1* | 2/2024 | Kim | H04W 76/30 |
| 2024/0284336 A1* | 8/2024 | Yang | H04W 52/0235 |
| 2024/0340997 A1* | 10/2024 | Ly | H04W 52/0216 |
| 2024/0389026 A1* | 11/2024 | Elazzouni | H04W 72/232 |
| 2025/0039728 A1* | 1/2025 | Martin | H04W 52/0235 |

OTHER PUBLICATIONS

3GPP TSG-RAN WG2 Meeting #119bis-e ; R2-2209488; Source: vivo; Title: Discussion on DRX Enhancements for XR Power Saving; Electronic, Oct. 10-Oct. 19, 2022 (Year: 2022).*

Technical specifications (TS) 38.201—"5G; NR; Physical layer; General description", 3GPP TS 38.201 version 15.0.0 Release 15, Sep. 2018, 14 pages.

Technical specifications (TS) 38.331—"5G; NR; Radio Resource Control (RRC); Protocol specification", 3GPP TS 38.331 version 16.1.0 Release 16, Jul. 2020, 886 pages.

Technical specifications (TS) 38.211—"5G; NR; Physical channels and modulation", 3GPP TS 38.211 version 16.2.0 Release 16, Jul. 2020, 136 pages.

Technical specifications (TS) 38.304—"5G; NR; User Equipment (UE) procedures in idle mode and in RRC Inactive state", 3GPP TS 38.304 version 16.1.0 Release 16, Jul. 2020, 41 pages.

Technical specifications (TS) 38.300—"5G; NR; NR and NG-RAN Overall description; Stage-2" 3GPP TS 38.300 version 16.4.0 Release 16, Jan. 2021, 151 pages.

Invitation to Pay Additional Fees mailed Mar. 11, 2024 for PCT Application No. PCT/US2023/036190, 18 pages.

Interdigital: "Report of [POST121] [311] [NES] DTX/DRX—gNB and UE behaviours", 3GPP Draft; R2-2303604, RAN WG2, No. Online, Apr. 7, 2023, [https://ftp.3gpp.org/tsg_ran/WG2_RL2/T SGR2_121bis-e/Docs/R2-2303604.zipR2-2303604_Report of [POST121] [311] [NES].docx ] 30 pages.

Samsung: "Network energy saving techniques", 3GPP Draft; RI-2203920, RAN WGI, No. e-Meeting; Apr. 29, 2022, [https://ftp.3gpp.org/tsg_ran/WG1_RL1/T SGR1_109-e/Docs/RI-2203920.zip RI-2203920 Network power saving techniques.docx] 8 pages.

International Search Report and Written Opinion mailed May 28, 2024 for PCT Application No. PCT/US2023/036190, 26 pages.

Esswie Ali A: "Power Saving Techniques in 3GPP 5G New Radio: A• Comprehensive Latency and Reliability Analysis", 2022 IEEE Wireless Communications and Networking Conference {WCNC), IEEE, Apr. 10, 2022, 6 pages.

Interdigital Inc: "Discussion on UL traffic models", 3GPP Draft; RI-2105499, RAN WGI, No. e-Meeting; May 11, 2021, [https://ftp.3gpp.org/tsg_ran/WGI_RLI/T SGR1_105 -e/Docs/RI-2105499.z_ip_RI-2105499 R17 NR XR A814I_UL Traffic models) .docx] 10 pages.

Notification Concerning Transmittal of International Preliminary Report on Patentability mailed Dec. 18, 2025 for PCT Application No. PCT/US2023/036190, 16 pages.

European Office Action mailed Jan. 15, 2026 for European Patent Application No. 23813924.0, 3 pages.

\* cited by examiner

300

400

Figure 4B:
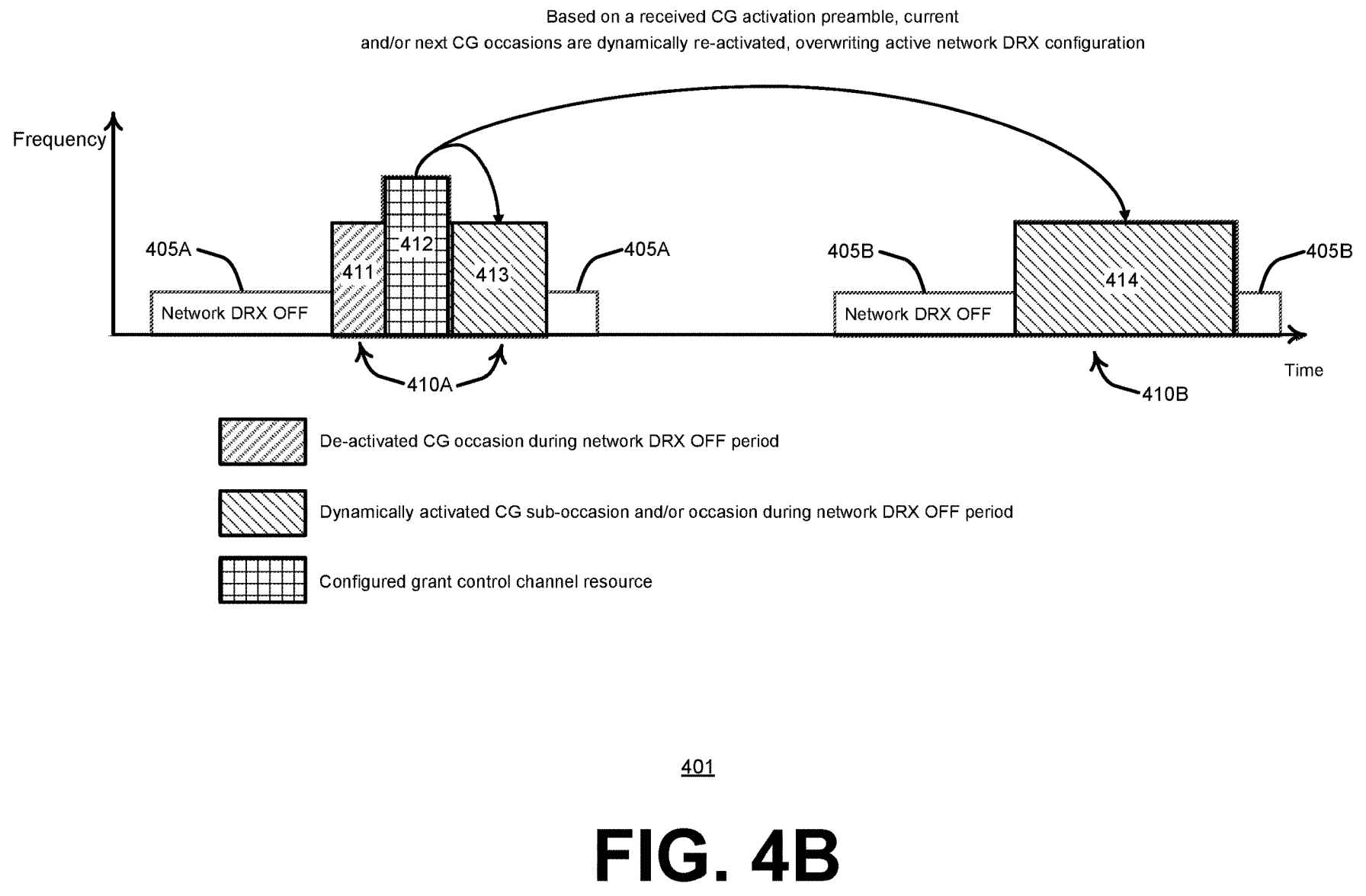

Based on a received CG activation preamble, current and/or next CG occasions are dynamically re-activated, overwriting active network DRX configuration

405B

405B    Network DRX OFF

410B

414

405A

413

412

411

410A

405A    Network DRX OFF

De-activated CG occasion during network DRX OFF period

Dynamically activated CG sub-occasion and/or occasion during network DRX OFF period Configured grant control channel resource Time Frequency

Figure 5:
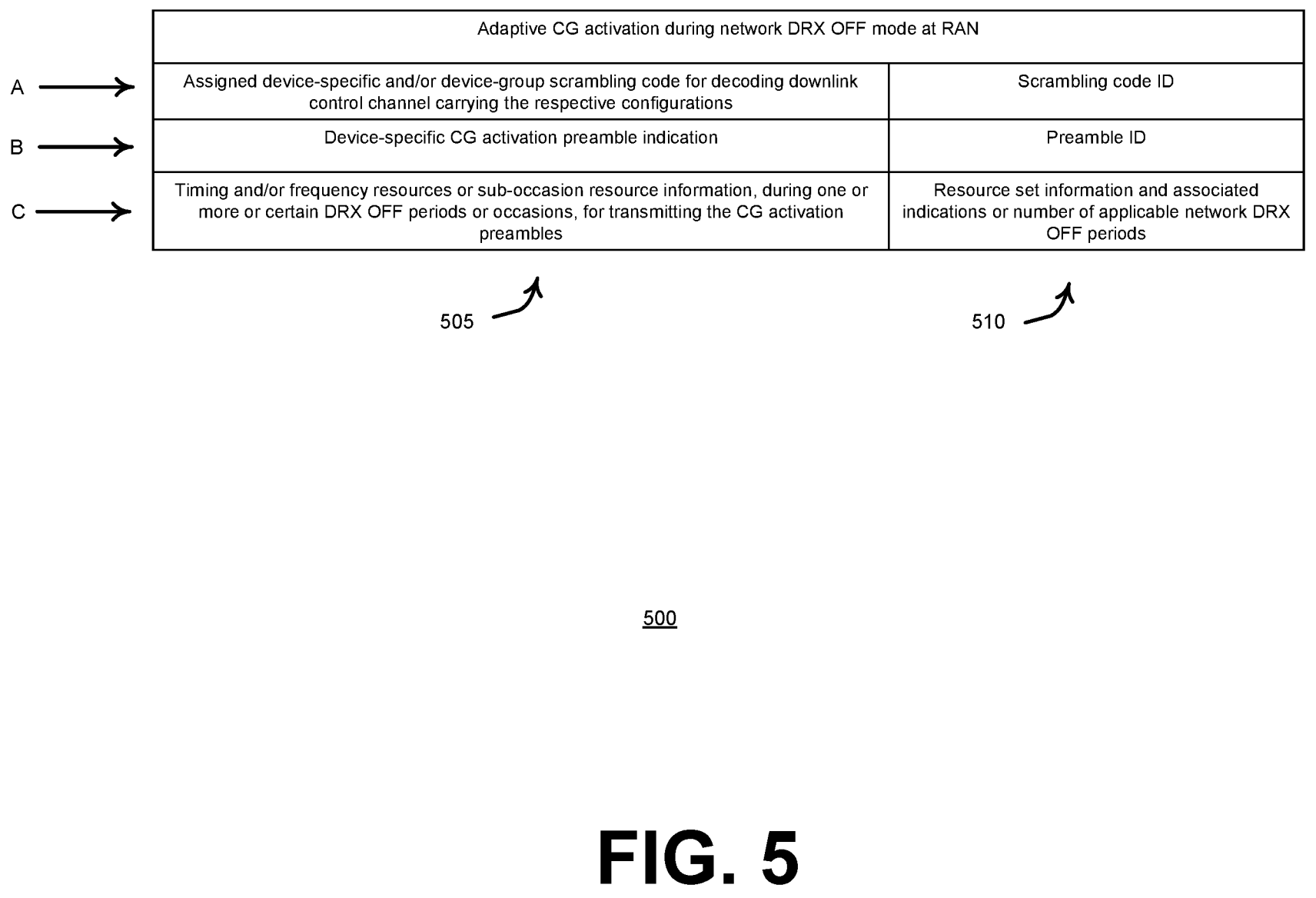

| Adaptive CG activation during network DRX OFF mode at RAN | |
|---|---|
| A → Assigned device-specific and/or device-group scrambling code for decoding downlink control channel carrying the respective configurations | Scrambling code ID |
| B → Device-specific CG activation preamble indication | Preamble ID |
| C → Timing and/or frequency resources or sub-occasion resource information, during one or more or certain DRX OFF periods or occasions, for transmitting the CG activation preambles | Resource set information and associated indications or number of applicable network DRX OFF periods |

Figure 6:
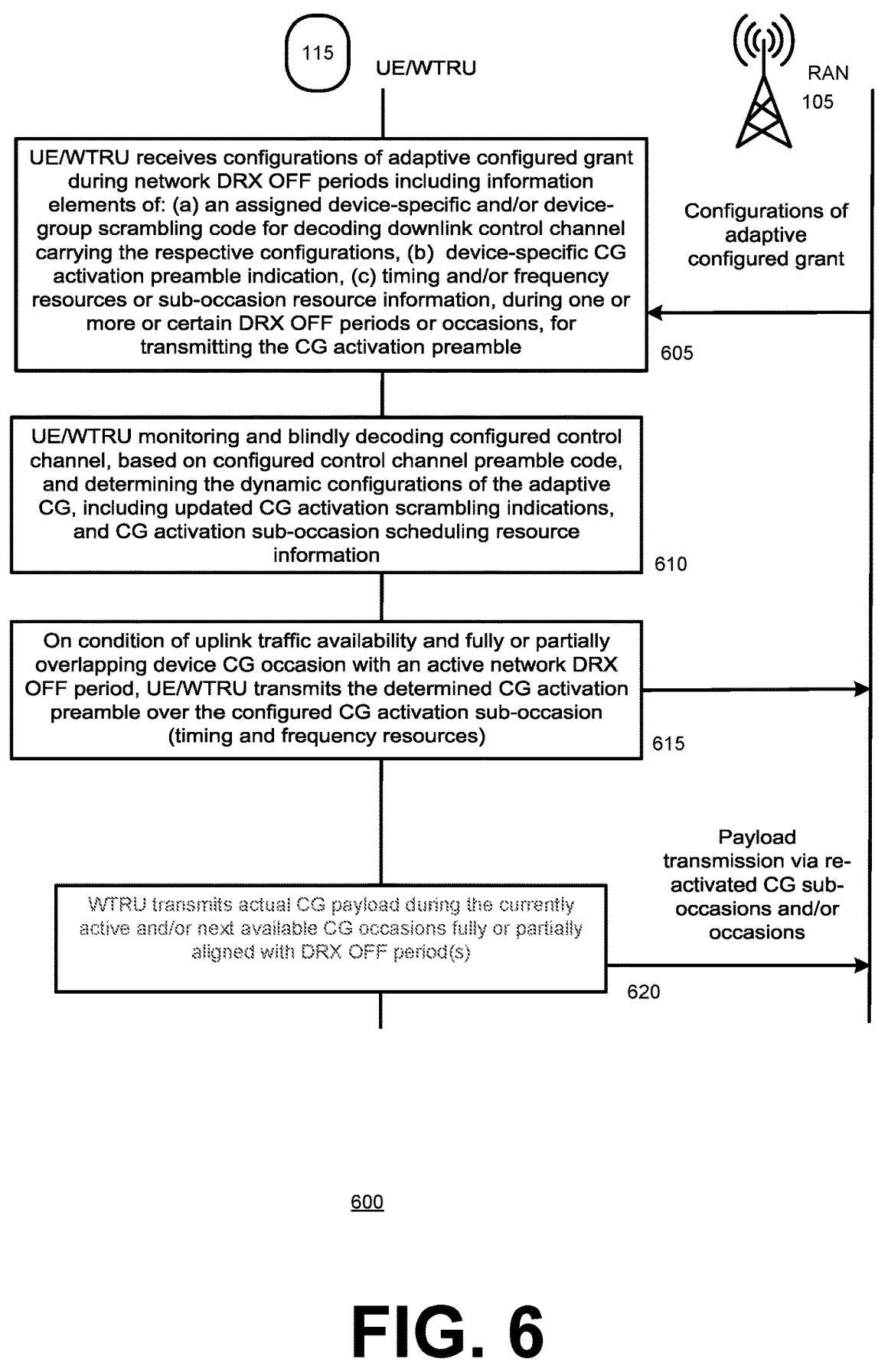

UE/WTRU

RAN
105

UE/WTRU receives configurations of adaptive configured grant during network DRX OFF periods including information elements of: (a) an assigned device-specific and/or device-group scrambling code for decoding downlink control channel carrying the respective configurations, (b) device-specific CG activation preamble indication, (c) timing and/or frequency resources or sub-occasion resource information, during one or more or certain DRX OFF periods or occasions, for transmitting the CG activation preamble Configurations of adaptive configured grant

605

UE/WTRU monitoring and blindly decoding configured control channel, based on configured control channel preamble code, and determining the dynamic configurations of the adaptive CG, including updated CG activation scrambling indications, and CG activation sub-occasion scheduling resource information

610

On condition of uplink traffic availability and fully or partially overlapping device CG occasion with an active network DRX OFF period, UE/WTRU transmits the determined CG activation preamble over the configured CG activation sub-occasion (timing and frequency resources)

615

WTRU transmits actual CG payload during the currently active and/or next available CG occasions fully or partially aligned with DRX OFF period(s)

Payload transmission via re-activated CG sub-occasions and/or occasions

Figure 9:
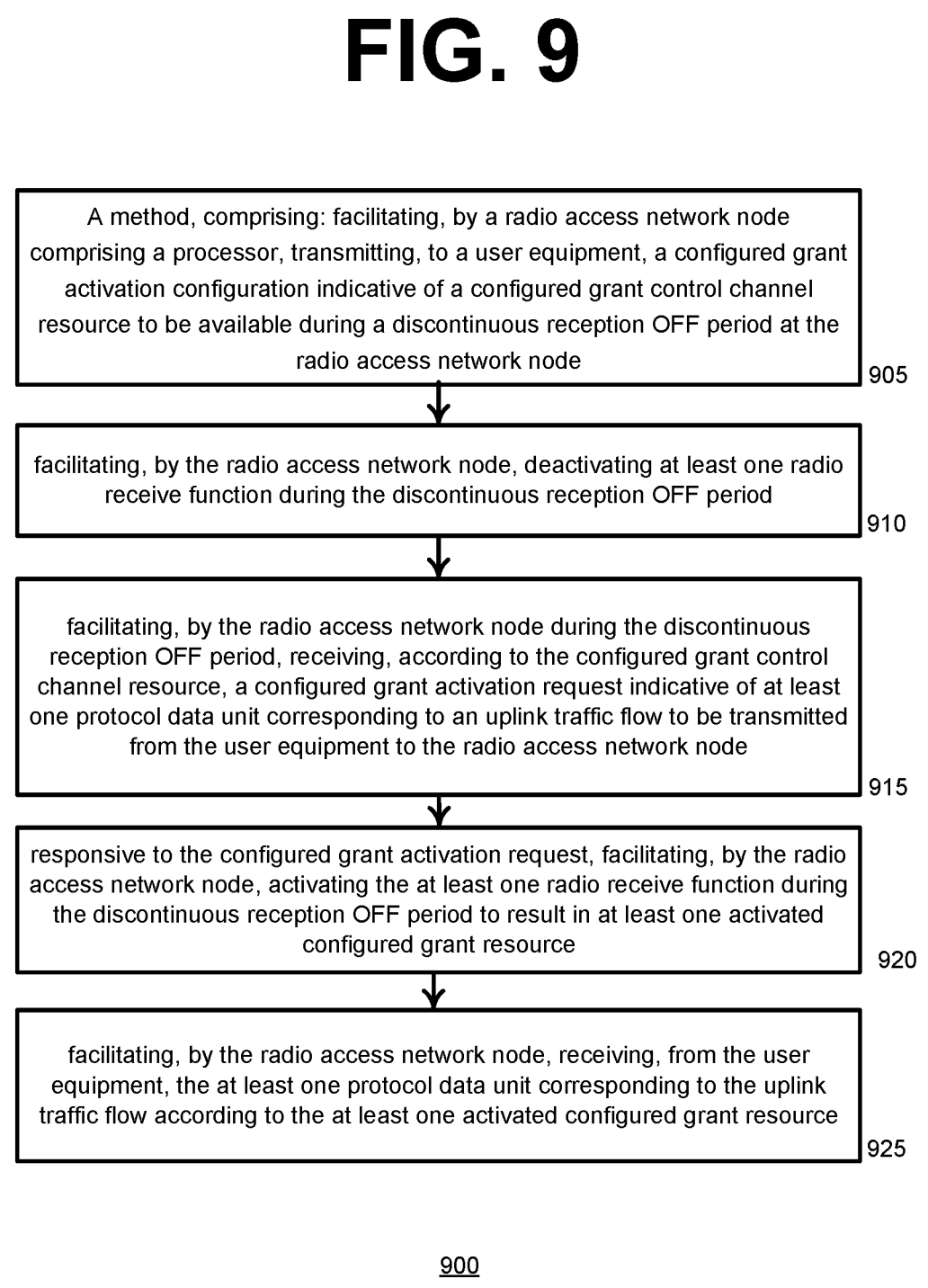

A method, comprising: facilitating, by a radio access network node comprising a processor, transmitting, to a user equipment, a configured grant activation configuration indicative of a configured grant control channel resource to be available during a discontinuous reception OFF period at the radio access network node
905 facilitating, by the radio access network node, deactivating at least one radio receive function during the discontinuous reception OFF period
910 facilitating, by the radio access network node during the discontinuous reception OFF period, receiving, according to the configured grant control channel resource, a configured grant activation request indicative of at least one protocol data unit corresponding to an uplink traffic flow to be transmitted from the user equipment to the radio access network node
915 responsive to the configured grant activation request, facilitating, by the radio access network node, activating the at least one radio receive function during the discontinuous reception OFF period to result in at least one activated configured grant resource
920 facilitating, by the radio access network node, receiving, from the user equipment, the at least one protocol data unit corresponding to the uplink traffic flow according to the at least one activated configured grant resource
925

Figure 10:
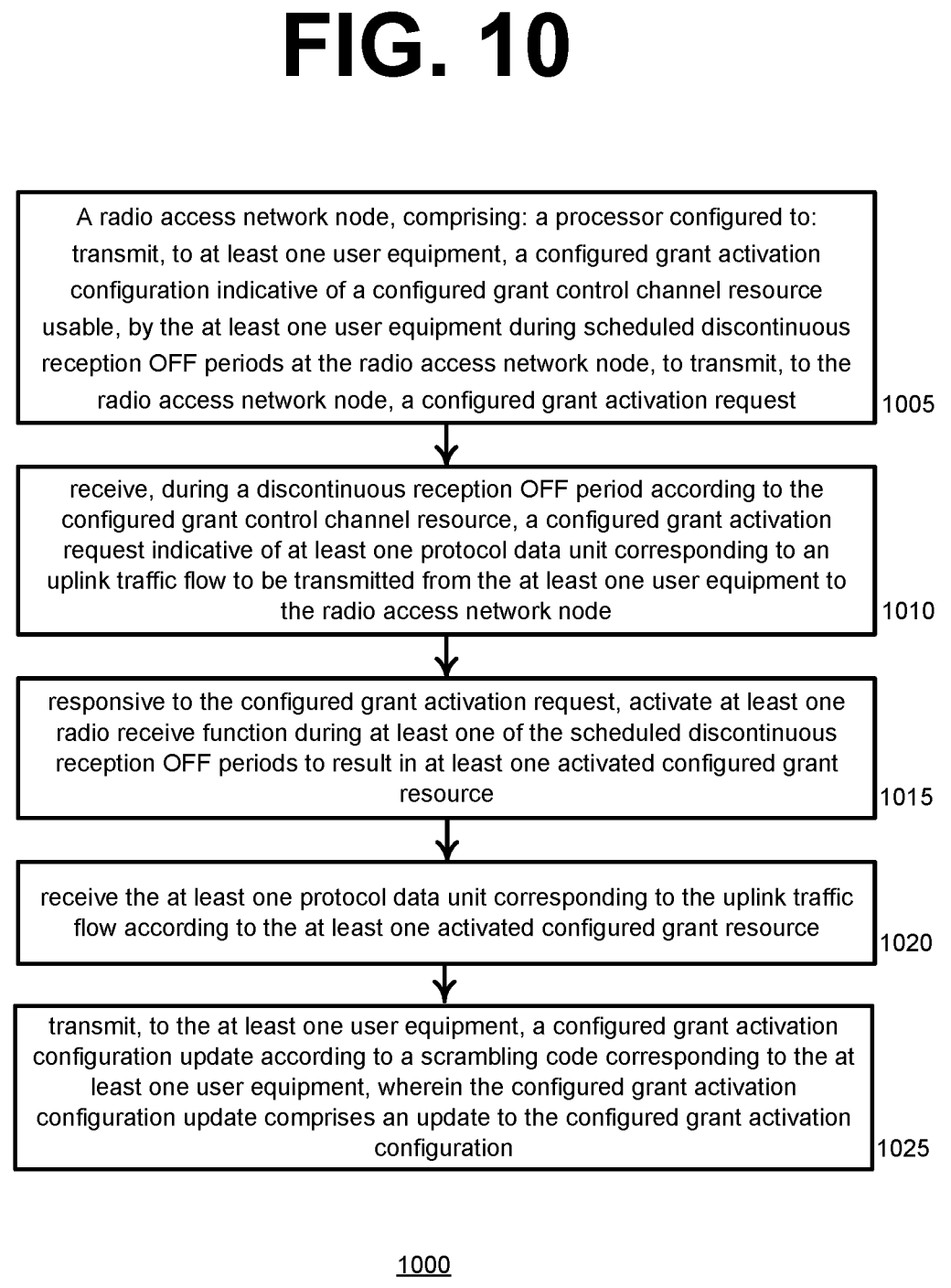

A radio access network node, comprising: a processor configured to: transmit, to at least one user equipment, a configured grant activation configuration indicative of a configured grant control channel resource usable, by the at least one user equipment during scheduled discontinuous reception OFF periods at the radio access network node, to transmit, to the radio access network node, a configured grant activation request — 1005 receive, during a discontinuous reception OFF period according to the configured grant control channel resource, a configured grant activation request indicative of at least one protocol data unit corresponding to an uplink traffic flow to be transmitted from the at least one user equipment to the radio access network node — 1010 responsive to the configured grant activation request, activate at least one radio receive function during at least one of the scheduled discontinuous reception OFF periods to result in at least one activated configured grant resource — 1015 receive the at least one protocol data unit corresponding to the uplink traffic flow according to the at least one activated configured grant resource — 1020 transmit, to the at least one user equipment, a configured grant activation configuration update according to a scrambling code corresponding to the at least one user equipment, wherein the configured grant activation configuration update comprises an update to the configured grant activation configuration — 1025

Figure 11:
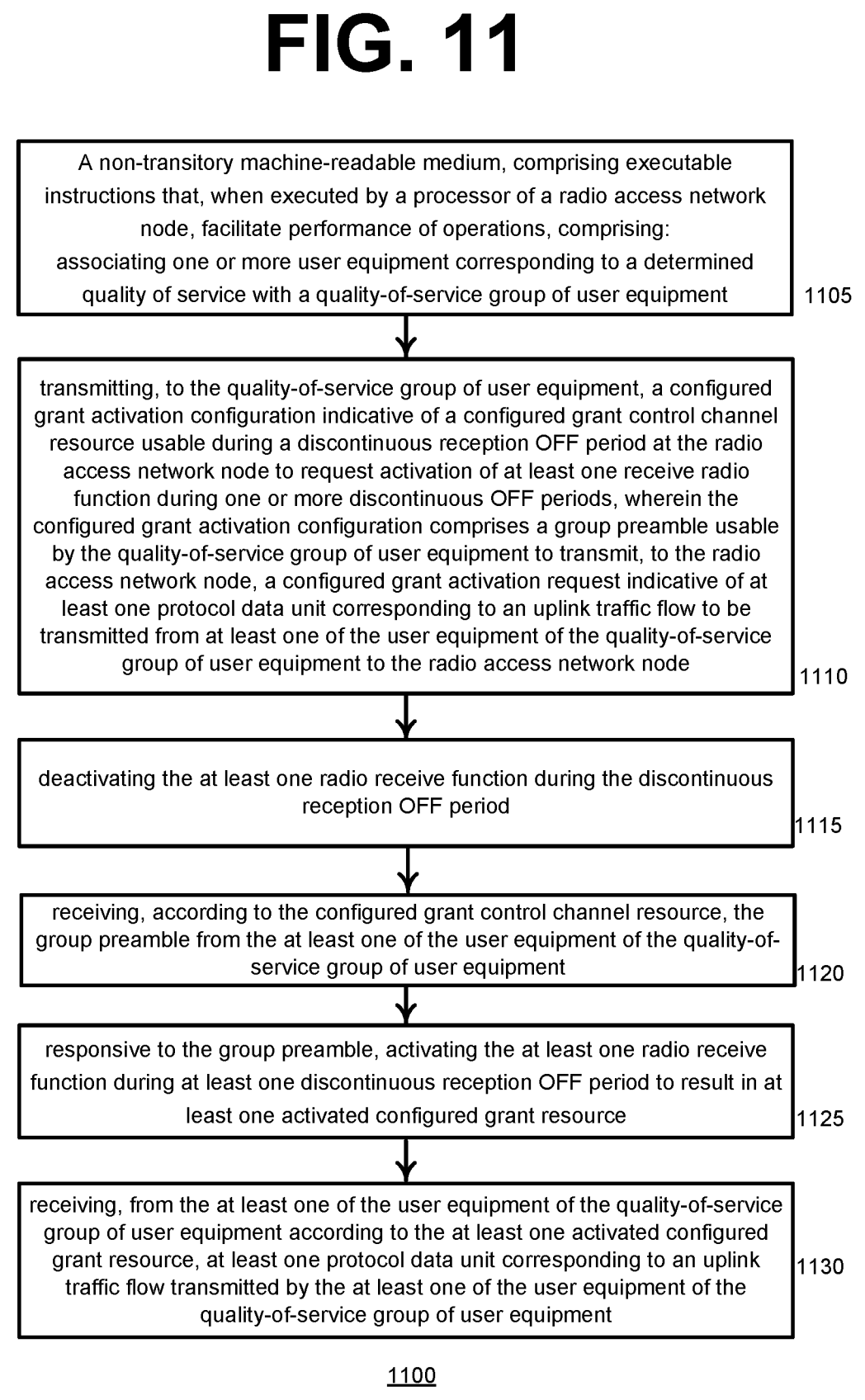

A non-transitory machine-readable medium, comprising executable instructions that, when executed by a processor of a radio access network node, facilitate performance of operations, comprising:
associating one or more user equipment corresponding to a determined quality of service with a quality-of-service group of user equipment          1105 transmitting, to the quality-of-service group of user equipment, a configured grant activation configuration indicative of a configured grant control channel resource usable during a discontinuous reception OFF period at the radio access network node to request activation of at least one receive radio function during one or more discontinuous OFF periods, wherein the configured grant activation configuration comprises a group preamble usable by the quality-of-service group of user equipment to transmit, to the radio access network node, a configured grant activation request indicative of at least one protocol data unit corresponding to an uplink traffic flow to be transmitted from at least one of the user equipment of the quality-of-service group of user equipment to the radio access network node          1110 deactivating the at least one radio receive function during the discontinuous reception OFF period          1115 receiving, according to the configured grant control channel resource, the group preamble from the at least one of the user equipment of the quality-of-service group of user equipment          1120 responsive to the group preamble, activating the at least one radio receive function during at least one discontinuous reception OFF period to result in at least one activated configured grant resource          1125 receiving, from the at least one of the user equipment of the quality-of-service group of user equipment according to the at least one activated configured grant resource, at least one protocol data unit corresponding to an uplink traffic flow transmitted by the at least one of the user equipment of the quality-of-service group of user equipment          1130

1100

ADAPTIVE CONFIGURED GRANT SCHEDULING

BACKGROUND

The 'New Radio' (NR) terminology that is associated with fifth generation mobile wireless communication systems ("5G") refers to technical aspects used in wireless radio access networks ("RAN") that comprise several quality of service classes (QoS), including ultrareliable and low latency communications ("URLLC"), enhanced mobile broadband ("eMBB"), and massive machine type communication ("mMTC"). The URLLC QoS class is associated with a stringent latency requirement (e.g., low latency or low signal/message delay) and a high reliability of radio performance, while conventional eMBB use cases may be associated with high-capacity wireless communications, which may permit less stringent latency requirements (e.g., higher latency than URLLC) and less reliable radio performance as compared to URLLC. Performance requirements for mMTC may be lower than for eMBB use cases. Some use case applications involving mobile devices or mobile user equipment such as smart phones, wireless tablets, smart watches, and the like, may impose on a given RAN resource loads, or demands, that vary. A RAN node may activate a network energy saving mode to reduce power consumption.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an example embodiment, a method may comprise facilitating, by a radio access network node comprising a processor, transmitting, to a user equipment, a configured grant activation configuration indicative of a configured grant control channel resource to be available during a discontinuous reception OFF period at the radio access network node. The method may further comprise facilitating, by the radio access network node, deactivating at least one radio receive function during the discontinuous reception OFF period. The method may further comprise facilitating, by the radio access network node during the discontinuous reception OFF period, receiving, according to the configured grant control channel resource, a configured grant activation request indicative of at least one protocol data unit corresponding to an uplink traffic flow to be transmitted from the user equipment to the radio access network node. Responsive to the configured grant activation request, the method may further comprise facilitating, by the radio access network node, activating the at least one radio receive function during the discontinuous reception OFF period to result in at least one activated configured grant resource, and facilitating, by the radio access network node, receiving, from the user equipment, the at least one protocol data unit corresponding to the uplink traffic flow according to the at least one activated configured grant resource. After receiving the at least one protocol data unit corresponding to the uplink traffic flow, the radio access network node may resume operation of a discontinuous reception OFF mode.

The configured grant activation request may comprise a device-specific preamble corresponding to the user equipment. The configured grant activation configuration may further comprise the device-specific preamble. The configured grant activation configuration may be transmitted via a radio resource control signal message. The configured grant activation configuration may comprise a configured grant activation configuration update scrambling code usable by the user equipment to decode updates to the configured grant activation configuration. In an embodiment, the configuration update scrambling code is specific to the user equipment.

In an embodiment, the user equipment may be a member of a group of user equipment. The configuration update scrambling code may be specific to the group of user equipment.

The method may further comprise facilitating, by the radio access network node, determining at least one determined traffic characteristic corresponding to the user equipment. The configured grant activation configuration comprises a number of configured grant occasions to be activated during respective discontinuous reception OFF periods based on the at least one determined traffic characteristic.

In an embodiment, the at least one radio receive function deactivated during the discontinuous reception OFF period may be a first radio receive function, and the facilitating of the receiving of the configured grant activation request may comprise facilitating, by the radio access network node, activating a second radio receive function to receive the configured grant activation request. In an embodiment, activating the second radio receive function may comprise activating an ultra-low-power receiver.

In an embodiment, the facilitating of the receiving of the configured grant activation request may comprise avoiding blind decoding of the configured grant activation request.

In an embodiment, the method may further comprise facilitating, by the radio access network node, receiving, from the user equipment, a quality-of-service indication indicative of a quality of service corresponding to the uplink traffic flow, wherein the configured grant activation configuration is transmitted to the user equipment based on correspondence of the uplink traffic flow to the quality-of-service.

In another example embodiment, a radio access network node may comprise a processor configured to transmit, to at least one user equipment, a configured grant activation configuration indicative of a configured grant control channel resource usable, by the at least one user equipment during scheduled discontinuous reception OFF periods at the radio access network node, to transmit, to the radio access network node, a configured grant activation request. The processor may be configured to receive, during a discontinuous reception OFF period (e.g., one of the scheduled discontinuous reception OFF periods) according to the configured grant control channel resource, a configured grant activation request indicative of at least one protocol data unit corresponding to an uplink traffic flow to be transmitted from the at least one user equipment to the radio access network node. Responsive to the configured grant activation request, the processor may be configured to activate at least one radio receive function during at least one of the scheduled discontinuous reception OFF periods to result in at least one activated configured grant resource, and receive the at least one protocol data unit corresponding to the uplink traffic flow according to the at least one activated configured grant resource.

In an embodiment, the processor may be further configured to transmit, to the at least one user equipment, a configured grant activation configuration update according to a scrambling code corresponding to the at least one user equipment, wherein the configured grant activation configuration update comprises an update to the configured grant activation configuration.

In an embodiment, the processor may be further configured to, based on the uplink traffic flow, determine at least one determined traffic characteristic corresponding to the at least one user equipment. The configured grant activation configuration may comprise a number of configured grant occasions to be activated during respective discontinuous reception OFF periods based on the at least one determined traffic characteristic.

In yet another example embodiment, a non-transitory machine-readable medium may comprise executable instructions that, when executed by a processor of a radio access network node, facilitate performance of operations, comprising associating one or more user equipment corresponding to a determined quality of service with a quality-of-service group of user equipment. The operations may further comprise transmitting, to the quality-of-service group of user equipment, a configured grant activation configuration indicative of a configured grant control channel resource usable during a discontinuous reception OFF period at the radio access network node to request activation of at least one receive radio function during one or more discontinuous OFF periods, wherein the configured grant activation configuration comprises a group preamble usable by the quality-of-service group of user equipment to transmit, to the radio access network node, a configured grant activation request indicative of at least one protocol data unit corresponding to an uplink traffic flow to be transmitted from at least one of the user equipment of the quality-of-service group of user equipment to the radio access network node. The operations may comprise deactivating the at least one radio receive function during the discontinuous reception OFF period and receiving, according to the configured grant control channel resource, the group preamble from the at least one of the user equipment of the quality-of-service group of user equipment. Responsive to the group preamble, the operations may further comprise activating the at least one radio receive function during at least one discontinuous reception OFF period to result in at least one activated configured grant resource, and receiving, from the at least one of the user equipment of the quality-of-service group of user equipment according to the at least one activated configured grant resource, at least one protocol data unit corresponding to an uplink traffic flow transmitted by the at least one of the user equipment of the quality-of-service group of user equipment.

In an embodiment, the at least one radio receive function may be a first radio receive function, and the operations may further comprise activating a second radio receive function to receive the group preamble.

In an embodiment, the configured grant activation configuration may comprise a group scrambling code usable by the quality-of-service group of user equipment to decode a configured grant activation configuration downlink control channel. The configured grant activation configuration may comprise at least one of: a timing resource, a frequency resources, a determined number of DRX OFF periods, or an occasion resource information element indicative of an uplink control channel resource usable to transmit, by the at least one user equipment of the quality-of-service group of user equipment to the radio access network node, the group preamble during one or more of the determined number of DRX OFF periods. In an embodiment, the operations may further comprise transmitting, to the quality-of-service group of user equipment, a grant activation configuration update via the configured grant activation configuration downlink control channel according to the group scrambling code, wherein the grant activation configuration update comprises an update to at least one of: the timing resource, the frequency resources, the determined number of DRX OFF periods, or the occasion resource information element indicative of an uplink control channel resource usable to transmit, by the at least one of the user equipment of the quality-of-service group of user equipment to the radio access network node, the group preamble during one or more of the determined number of DRX OFF periods.

BRIEF DESCRIPTION OF THE DRAWINGS

FIG. 4B illustrates a resource diagram of configured grant control channel resources usable during discontinuous reception OFF periods at the radio access network node to request activation of discontinuous reception OFF periods at a radio access network node.

FIG. 5 illustrates example configured grant activation configuration.

FIG. 6 illustrates a timing diagram of an example embodiment to activate, during a discontinuous OFF period, activation of receive functionality during the discontinuous OFF period.

FIG. 9 illustrates a block diagram of an example method embodiment.

FIG. 10 illustrates a block diagram of an example radio access network node.

FIG. 11 illustrates a block diagram of an example non-transitory machine-readable medium embodiment.

DETAILED DESCRIPTION OF THE DRAWINGS

Figure 1:
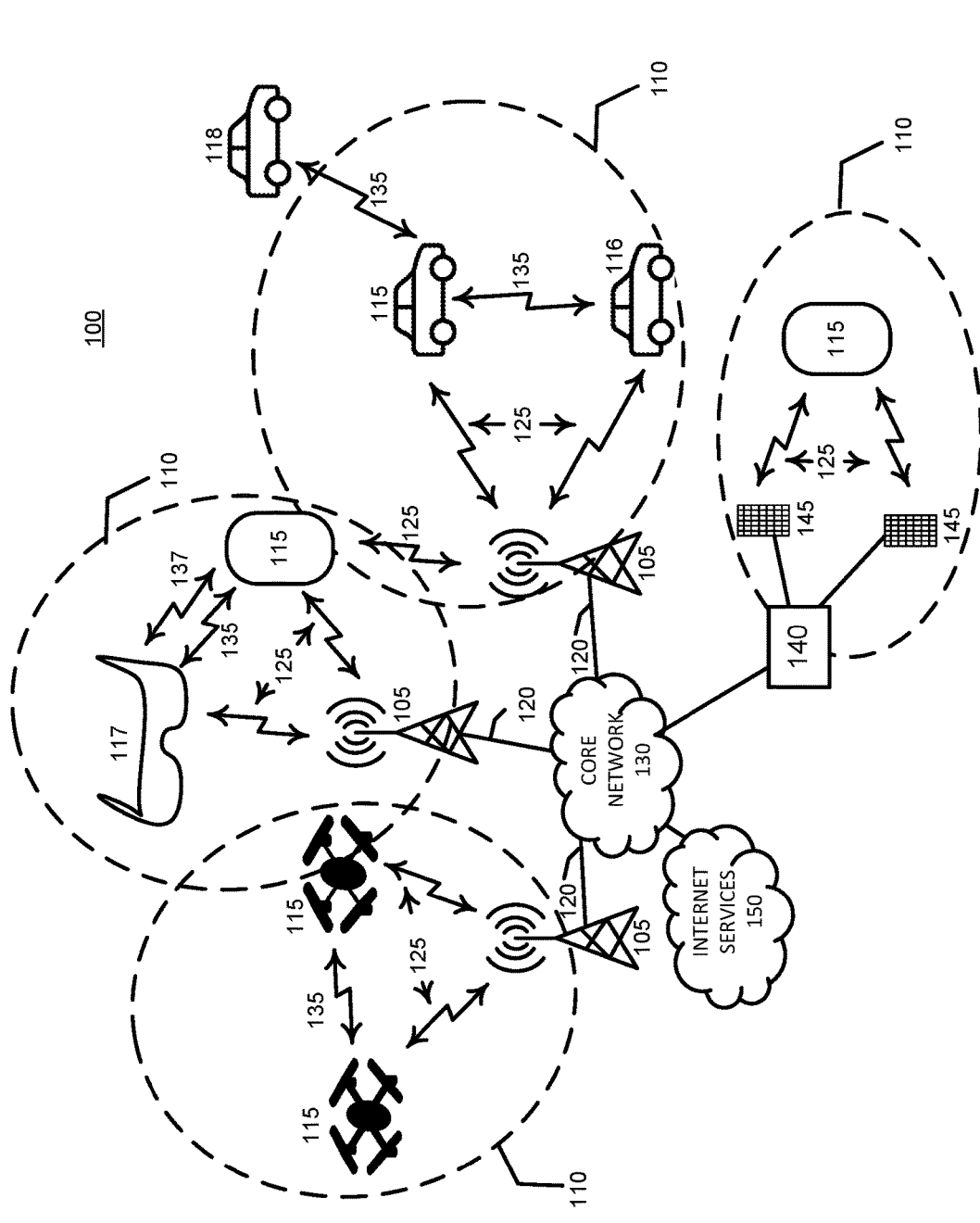
FIG. 1 illustrates wireless communication system environment.

As a preliminary matter, it will be readily understood by those persons skilled in the art that the present embodiments are susceptible of broad utility and application. Many methods, embodiments, and adaptations of the present application other than those herein described as well as many variations, modifications and equivalent arrangements, will be apparent from or reasonably suggested by the substance or scope of the various embodiments of the present application.

Accordingly, while the present application has been described herein in detail in relation to various embodiments, it is to be understood that this disclosure is illustrative of one or more concepts expressed by the various example embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. In yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

As an example use case that illustrates example embodiments disclosed herein, Virtual Reality ("VR") applications and VR variants, (e.g., mixed and augmented reality) may at some time perform best when using NR radio resources associated with URLLC while at other times lower performance levels may suffice. A virtual reality smart glass device may consume NR radio resources at a given broadband data rate having more stringent radio latency and reliability criteria to provide a satisfactory end-user experience.

5G systems should support 'anything reality' ("XR") services. XR services may comprise VR applications, which are widely adopted XR applications that provide an immersive environment which can stimulate the senses of an end user such that he, or she, may be 'tricked' into the feeling of being within a different environment than he, or she, is actually in. XR services may comprise Augmented Reality ('AR') applications that may enhance a real-world environment by providing additional virtual world elements via a user's senses that focus on real-world elements in the user's actual surrounding environment. XR services may comprise Mixed reality cases ("MR") applications that help merge, or bring together, virtual and real worlds such that an end-user of XR services interacts with elements of his, or her, real environment and virtual environment simultaneously.

Different XR use cases may be associated with certain radio performance targets. Common to XR cases, and unlike URLLC or eMBB, high-capacity links with stringent radio and reliability levels are typically needed for a satisfactory end user experience. For instance, compared to a 5 Mbps URLLC link with a 1 ms radio budget, some XR applications need 100 Mbps links with a couple of milliseconds of allowed radio latency. Thus, 5G radio design and associated procedures may be adapted to the new XR QoS class and associated performance targets.

An XR service may be facilitated by traffic having certain characteristics associated with the XR service. For example, XR traffic may typically be periodic with time-varying packet size and packet arrival rate, but may also be sporadic, or bursty, in nature. In addition, different packet traffic flows of a single XR communication session may affect an end user's experience differently. For instance, a smart glass that is streaming 180-degree high-resolution frames may use a large percentage of a broadband service's capacity for fulfilling user experience. However, frames that are to be presented to a user's pose direction (e.g., front direction) are the most vital for an end user's satisfactory user experience while frames to be presented to a user's periphery vision have less of an impact on a user's experience and thus may be associated with a lower QoS requirement for transport of traffic packets as compared to a QoS requirement for transporting the pose-direction traffic flow. Therefore, flow differentiation that prioritizes some flows, or some packets, of a XR session over other flows or packets may facilitate efficient use of a communication system's capacity to deliver the traffic. Furthermore, XR capable devices (e.g., smart glasses, projection wearables, etc.) may be more power-limited than conventional mobile handsets due to the limited form factor of the devices. Thus, techniques to maximize power saving operation at XR capable device is desirable. Accordingly, a user equipment device accessing XR services, or traffic flows of an XR session, may be associated with certain QoS metrics to satisfy performance targets of the XR service in terms of perceived data rate or end to end latency and reliability, for example.

High-capacity-demanding services, such as virtual reality applications, may present performance challenges to even 5G NR capabilities. Thus, even though 5G NR systems may facilitate and support higher performance capabilities, the radio interface should nevertheless be optimized to support extreme high capacity and low latency requirements of XR applications and XR data traffic while minimizing power consumption.

Turning now to the figures, FIG. 1 illustrates an example of a wireless communication system 100 that supports blind decoding of PDCCH candidates or search spaces in accordance with one or more example embodiments of the present disclosure. The wireless communication system 100 may include one or more base stations 105, one or more user equipment ("UE") devices 115, and core network 130. In some examples, the wireless communication system 100 may comprise a long-range wireless communication network, that comprises, for example, a Long-Term Evolution (LTE) network, an LTE-Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof. As shown in the figure, examples of UEs 115 may include smart phones, automobiles or other vehicles, or drones or other aircraft. Another example of a UE may be a virtual reality appliance 117, such as smart glasses, a virtual reality headset, an augmented reality headset, and other similar devices that may provide images, video, audio, touch sensation, taste, or smell sensation to a wearer. A UE, such as VR appliance 117, may transmit or receive wireless signals with a RAN base station 105 via a long-range wireless link 125, or the UE/VR appliance may receive or transmit wireless signals via a short-range wireless link 137, which may comprise a wireless link with a UE device 115, such as a Bluetooth link, a Wi-Fi link, and the like. A UE, such as appliance 117, may simultaneously communicate via multiple wireless links, such as over a link 125 with a base station 105 and over a short-range wireless link. VR appliance 117 may also communicate with a wireless UE via a cable, or other wired connection. A RAN, or a component thereof, may be implemented by one or more computer components that may be described in reference to FIG. 12.

Continuing with discussion of FIG. 1, base stations 105 may be dispersed throughout a geographic area to form the wireless communication system 100 and may be devices in different forms or having different capabilities. The base stations 105 and the UEs 115 may wirelessly communicate via one or more communication links 125. Each base station 105 may provide a coverage area 110 over which UEs 115 and the base station 105 may establish one or more communication links 125. Coverage area 110 may be an example of a geographic area over which a base station 105 and a UE 115 may support the communication of signals according to one or more radio access technologies.

UEs 115 may be dispersed throughout a coverage area 110 of the wireless communication system 100, and each UE 115 may be stationary, or mobile, or both at different times. UEs 115 may be devices in different forms or having different capabilities. Some example UEs 115 are illustrated in FIG. 1. UEs 115 described herein may be able to communicate with various types of devices, such as other UEs 115, base stations 105, or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with core network 130 through one or more backhaul links 120 (e.g., via an S1, N2, N3, or other interface). Base stations 105 may communicate with one another over the backhaul links 120 (e.g., via an X2, Xn, or other interface) either directly (e.g., directly between base stations 105), or indirectly (e.g., via core network 130), or both. In some examples, backhaul links 120 may comprise one or more wireless links.

One or more of base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a bNodeB or gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, a personal computer, or a router. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or smart meters, among other examples.

UEs 115 may be able to communicate with various types of devices, such as other UEs 115 that may sometimes act as relays as well as base stations 105 and the network equipment including macro eNBs or gNBs, small cell eNBs or gNBs, or relay base stations, among other examples, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. Wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications e.g., in a TDD mode).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of determined bandwidths for carriers of a particular radio access technology (e.g., 1.4, 3, 5, 10, 15, 20, 40, or 80 megahertz (MHZ)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol)

and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE. A wireless communications resource may refer to a combination of a radio frequency spectrum resource, a time resource (e.g., a search space), or a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for a UE 115 may be restricted to one or more active BWPs.

The time intervals for base stations 105 or UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally, or alternatively, the smallest scheduling unit of the wireless communication system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region e.g., a control resource set (CORE-SET)) for a physical control channel may be defined by a number of symbol periods and may extend across the system bandwidth or a subset of the system bandwidth of the carrier.

One or more control regions (e.g., CORESETs) may be configured for a set of UEs 115. For example, one or more of UEs 115 may monitor or search control regions, or spaces, for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115. Other search spaces and configurations for monitoring and decoding them are disclosed herein that are novel and not conventional.

A base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of a base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., UEs 115 in a closed subscriber group (CSG), UEs 115 associated with users in a home or office). A base station 105 may support one or multiple cells and may also support communications over the one or more cells using one component carrier, or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). Communication link 135 may comprise a sidelink communication link. One or more UEs 115 utilizing D2D communications, such as sidelink communication, may be within the geographic coverage area 110 of a base station 105. Other UEs 115 in such a group may be outside the geographic coverage area 110 of a base station 105 or be otherwise unable to receive transmissions from a base station 105. In some examples, groups of UEs 115 communicating via D2D communications may utilize a one-to-many (1:M) system in which a UE transmits to every other UE in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more RAN network nodes (e.g., base stations 105) using vehicle-to-network (V2N) communications, or with both. In FIG. 1, vehicle UE 116 is shown inside a RAN coverage area and vehicle UE 118 is shown outside the coverage area of the same RAN. Vehicle UE 115 wirelessly connected to the RAN may be a sidelink relay to in-RAN-coverage-range vehicle UE 116 or to out-of-RAN-coverage-range vehicle UE 118.

The core network 130 may provide user authentication, access authorization, tracking, Internet Protocol (IP) connectivity, and other access, routing, or mobility functions. Core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for UEs 115 that are served by the base stations 105 associated with core network 130. User IP packets may be transferred through the user plane entity, which may provide IP address allocation as well as other functions. The user plane entity may be connected to IP services 150 for one or more network operators. IP services 150 may comprise access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices e.g., radio heads and ANCs) or consolidated into a single network device (e.g., a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHZ.

The wireless communication system 100 may also operate in a super high frequency (SHF) region using frequency bands from 3 GHZ to 30 GHZ, also known as the centimeter band, or in an extremely high frequency (EHF) region of the spectrum (e.g., from 30 GHz to 300 GHz), also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHZ industrial, scientific, and medical (ISM) band. When operating in unlicensed radio frequency spectrum bands, devices such as base stations 105 and UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, a base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by a base station 105 in different directions and may report to the base station an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). A UE 115 may report feedback that indicates precoding weights for one or more beam directions, and the feedback may correspond to a configured number of beams across a system bandwidth or one or more sub-bands. A base station 105 may transmit a reference signal (e.g., a cell-specific reference signal (CRS), a channel state information reference signal (CSI-RS)), which may be precoded or unprecoded. A UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Discontinuous Transmission ("DTX") and Discontinuous Reception ("DRX")

Energy saving gains can be obtained at user equipment or radio access network nodes. Energy saving techniques may result in energy savings, but may also result in negative impact on radio signaling and functionality. Conventional techniques include multiple techniques for achieving energy saving. For example, to achieve an energy saving gain at user equipment devices, discontinuous reception ("DRX") procedures are a key optimization technique. Conventional DRX techniques may comprise user equipment or radio access network nodes not operating receivers continuously in a full power active state. During a DRX OFF state or period, a user equipment or a radio access network node may not perform any radio functions, e.g., the UE may not monitor control channels, receive reference signals, or receive or transmit traffic.

DTX and DRX procedures may facilitate efficient energy saving gain at the RAN nodes and user equipment devices. DTX may refer to a transmitter, which may be a UE transmitter or a RAN node transmitter, transmitting radio signals including traffic, reference signals, or control information during certain periods of time, (e.g., periodic DTX ON periods) while the UE or RAN transmitter otherwise remains in DTX OFF. During a DTX OFF state, or DTX OFF period, most of, or all of, a transmitter's transmission radio chain may be shut down to achieve an energy saving gain. DRX may refer to a receiver being able to receive radio signals (traffic, control information and/or reference signals) during periodic DRX ON periods while otherwise being an OFF state during which radio circuits or functions may be off or idle. During a DRX OFF period a user equipment device may be considered as not effectively connected to a RAN network since the UE shuts down partially or fully its reception radio chain during a DRX OFF period.

DTX and DRX procedures may facilitate energy saving gains due to regular deactivation of either or both of receiver and transmitter chains. However, shutting down a transmitter or receiver chain may come at the expense of degraded radio performance, since during DTX OFF or DRX OFF periods transmitters or receivers are not available for radio operations. Thus, DRX OFF or DTX OFF periods may cause, or increase, traffic buffering delay. For example, when a packet is available at a UE or at RAN node for transmission towards a RAN, or UE, respectively, but the RAN or UE is currently operating according to a configured DRX OFF period such that the a radio frequency receiver if the RAN or UE is not operational, the RAN or UE cannot receive radio traffic payload. Accordingly, the UE or RAN node transmitter may buffer such available traffic until a DRX ON period of the RAN or UE begins. A straightforward solution to minimize buffering delay due to primary DRX OFF period buffering is to set the periodicity of a DRX ON period of a receiving device (e.g., RAN or UE) to be aligned in time with a periodicity, which may be a statistical average periodicity, corresponding to traffic packet arrivals that are directed to the receiving device. However, for multi-flow traffic, where different traffic flows have different respective packet arrival periodicities, existing single periodicity and static DRX cycle deigns may not efficiently support latency-critical traffic delivery.

Configured Grant ("CG") Scheduling

CG scheduling is a type of uplink resource scheduling to facilitate minimum latency scheduling, which typically suits latency stringent traffic arrivals at a user equipment. With conventional CG scheduling, a RAN node semi-statically configures one or more periodic resource sets or resource occasions for user equipment devices to adopt for transmitting arriving uplink traffic having a stringent quality requirement. Conventional CG resource sets may comprise certain frequency resources, assigned for a certain amount of time, and repeated periodically, for user equipment device to use to transmit uplink traffic. Thus, when a user equipment has latency-stringent critical uplink packet arrivals to be transmitted, the user equipment may immediately transmit one or more of the critical traffic packets during next available one or more configured CG occasions. Using scheduled grant resources to transmit uplink traffic a user equipment may experience buffering delay resulting from the user equipment first requesting a scheduling grant, with an indication of a quantity of uplink traffic to be transmitted, receiving a resource grant, and finally transmitting uplink traffic via dynamically scheduled uplink data resources.

Conventional CG scheduling offers fast transmission of uplink packets with less control overhead compared to scheduled granting of resources. However, conventional CG scheduling functions best when a packet arrival rate at a user equipment device is almost periodic. For example, to maximize spectral efficiency, a RAN may align a CG resource occasion periodicity corresponding to a device to align with the user equipment's expected packet arrival rate. Thus, conventionally configured CG resource sets or occasions may result in efficient usage by user equipment with critical traffic that is substantially period. Furthermore, a CG resource set or occasion can be dedicated to a single user equipment or may be shared among multiple active user equipment, where each user equipment is assigned an orthogonal scrambling code or preamble to modulate traffic. Using device-specific, or group-specific, scrambling codes may provide a benefit when more than one user equipment transmits uplink payloads simultaneously over the same CG resource occasion. Thus, with orthogonal preamble modulation of traffic corresponding to multiple user equipment, a RAN node can distinguish and decode different traffic streams from the different user equipment devices.

Network energy saving ("NES") is desirable, but typical NES techniques trade off part of achievable radio performance to achieve NES gains, which performance trade off may not be tolerated for some critical cellular services. For example, using DRX, a RAN node may halt all radio reception operations during periodic occasions (e.g., during DRX OFF periods), and after a DRX period a RAN node may resume normal uplink signal receptions from active user devices (e.g., during DRX ON periods). Implementing DRX techniques and functionality at a RAN node may facilitate the RAN node shutting down one or more receive radio chains during DRX OFF periods, and accordingly facilitate achieving an energy saving gain. Although implementing DRX at a RAN node may result in energy saving gain, DRX at a RAN node may negatively impact uplink radio performance of critical services, which may demand stringent radio latency targets. Typically, for user equipment operating a communication session comprising latency stringent traffic, a RAN node may pre-configure periodic resource sets (e.g., resource grants) during which user equipment may immediately use the pre-configured resources for useful (e.g., commercially valuable data traffic as opposed to control traffic) uplink traffic transmissions. The pre-configured resources may be referred to as configured grant scheduling, since periodic (timing and frequency) resource sets are semi-statically pre-configured for immediate uplink traffic transmissions by different active user equipment devices. When a RAN node adopts an energy efficient DRX procedure pre-configured CG resource sets (or resource occasions), which partially or fully overlap in time with a an adopted DRX OFF periods are, assumed by a user equipment as being cancelled, since the RAN node will not be able to receive any uplink signal or traffic during those periods. Consequently, uplink data latency performance can be significantly degraded since user equipment conducting a communication session with a RAN will have to buffer available uplink payload during a DRX OFF period until a next available CG resource occasion that does not overlap with any of the configured network DRX periods, thus adding significant traffic buffering delays.

As discussed, configured grant scheduling may facilitate reducing uplink latency associated with transmitting of uplink traffic. With conventional CG scheduling, multiple periodic CG resource sets or occasions may be pre-configured for active user equipment devices to immediately transmit arriving uplink traffic. However, when a RAN node enables energy saving DRX procedures and corresponding shutting down of radio reception operations during DRX OFF periods, performance of the CG scheduling may be significantly degraded, thus subverting the low latency advantage provided by CG scheduling. A pre-configured CG resource set or CG resource occasion that partially or fully aligns with any of the active network DRX OFF periods is by default assumed by active user equipment devices as being cancelled or de-activated. User equipment devices conventionally will not waste power and resources attempting to transmit uplink traffic during a time period during which a RAN is neither receiving any uplink radio signals nor monitoring any uplink channels. User equipment conventionally buffers uplink traffic until a next available one or more CG resource occasions which are not overlapping with a DRX OFF period at the RAN. Thus, the buffering delay corresponding to uplink traffic during a DRX OFF period undermines a basic purpose of the CG scheduling.

To alleviate undermining of the purpose of CG scheduling while still implementing NES, a RAN node may schedule DRX OFF periods not to overlap in time with CG resource occasions corresponding to all configured active user equipment being serviced by the RAN. However, due to different user equipment devices having various CG resource occasion sets that align with respective traffic arrival rates corresponding to the user equipment, scheduling CG occasions not to coincide with DRAX OFF periods may lead to a RAN node adopting few DRX OFF periods. Thus, from the perspective of a RAN node, minimal NES gain may be achievable without significantly impacting the uplink latency performance for multiple active user equipment devices. Accordingly, embodiments disclosed herein facilitate dynamically satisfying NES gain while minimizing tradeoff of uplink radio latency performance when there is actual uplink traffic available to be transmitted to a RAN by an active user equipment when the available uplink traffic is on the cusp of violating a radio latency target corresponding to the traffic.

Adaptive Configured Grant Scheduling for Network Energy Saving

Embodiments disclosed herein may facilitate RAN node DRX procedures dynamically adapting to real-time conditions of uplink traffic arrivals and associated quality-of-service ('QoS') (e.g., reliability and radio latency budgets) instead of the RAN node implementing DRX conventional behavior of receiving all uplink signals over DRX ON periods and halting all uplink receptions during DRX OFF periods at the RAN. Dynamic CG scheduling and re-activation embodiments may implement novel downlink and uplink control signaling to facilitate NES while minimizing undermining of the latency advantage of CG scheduling.

A novel dynamic CG resource re-activation procedure disclosed herein may facilitate a RAN node overwriting the RAN's active NES DRX OFF behavior upon determining an availability of latency stringent uplink traffic at an active user equipment being served by the RAN. The RAN can achieve a NES gain (due to the adoption of DRX OFF periods) while not impacting the radio latency performance of latency stringent uplink traffic (due to the proposed adaptive CG and DRX OFF activation/deactivation). A novel, short-duration uplink control channel may be defined and configured for active devices during CG resource occasions that may partially or fully overlap with one or more DRX OFF periods. Thus, upon arrival of stringent uplink payload at a user equipment device during a CG occasion that overlaps with an active network DRX OFF period, the user equipment device may transmit a novel uplink preamble, determined based on a configuration received from the RAN node, via a newly-defined uplink control channel. From the perspective of the RAN node, the RAN may temporarily suspend DRX mode operation (e.g., the RAN activates at least one receive function that is normally deactivated during a DRX OFF period) during a DRX OFF period to potentially receive, during the novel, short-duration uplink control channel, uplink preambles transmitted by an active user equipment device corresponding to buffered stringent uplink traffic. Upon receiving and decoding at least a single uplink preamble for dynamic CG re-activation, the RAN node may halt DRX Off mode behavior (e.g., the RAN activates receive functionality) during a current and next one or more DRX OFF period (the number of DRX OFF periods during which CG occasions may be activated during a DRX OFF period may be based on a configuration transmitted to one or more user equipment). Therefore, after transmitting the preamble according to the novel, short-duration uplink control channel, user equipment devices may immediately 'assume' that a current CG resource occasion and/or one or more next CG occasions are re-activated, regardless of whether the CG occasions overlap (partially or fully) with a previously-configured general network DRX OFF. Accordingly, user equipment can transmit uplink traffic payload over the re-activated CG resource occasions without the need for buffering the latency-stringent payload for long periods. Embodiments disclosed herein may facilitate dynamic adaptation of general network DRX OFF periods (implemented to achieve NES gain) and dynamic CG resource re-activation when latency critical uplink traffic is available, thus not impacting uplink radio latency performance of critical services.

Embodiments disclosed herein may facilitate user equipment behavior during NES DRX OFF and CG periods corresponding to the user equipment individually, or as members of a group of user equipment, that satisfies a RAN node energy saving gain and uplink traffic radio latency requirements. With embodiments disclosed herein, a RAN node may define a novel uplink control channel with timing and frequency resources within CG resource occasions that partially or fully overlap with DRX OFF periods at the RAN. (DRX OFF periods are assumed fully canceled according to current/conventional techniques.) The novel uplink control channel may be used by a user equipment to transmit a CG resource occasion re-activation request comprising indications that the user equipment has received latency-stringent uplink payload to be transmitted to the RAN. The novel CG re-activation indications may be pre-configured from the RAN and can take the form of pre-defined uplink device-specific preambles accordingly.

Therefore, from the perspective of a user equipment, embodiments disclosed herein may facilitate: (1) the user equipment determining which currently configured CG resource occasions overlap partially or fully with configured DRX OFF periods at a RAN; (2) user equipment assuming that determined CG occasions are by default cancelled during RAN DRX OFF periods; (3) on condition of latency critical uplink traffic availability at a user equipment device during a DRX Off cancelled CG occasion, the user equipment may determine a CG occasion re-activation indication and/or preamble from a configuration received from the RAN and transmit the preamble via a configured novel uplink control channel during the currently-cancelled CG occasion. (4) The user equipment may assume that the current CG occasion and/or a next number of CG occasions (e.g., based on network pre-configurations) have been dynamically re-activated regardless of whether the CG occasion may be overlapping with any of the active DRX OFF periods at the RAN; and (5) the user equipment may transmit the available, latency-stringent uplink payload according to the CG resource occasions without additional buffering delay.

From the RAN perspective, the following new behaviors and downlink signaling may be implemented: (1) the RAN by default assumes that pre-configured uplink CG occasions of user equipment that overlap partially or fully with any DRX OFF periods at the RAN are temporarily cancelled (e.g., the RAN has not expectation of receiving any CG payload from user equipment devices. (2) The RAN transmits downlink control information (DCI) over user equipment devices' control channels, carrying dynamic CG re-activation control information including a device-specific CG occasions re-activation indication and/or preamble, and CG re-activation uplink control channel search space information usable for carrying the indications or preambles. (3) During a DTX OFF period that overlaps in time at least with a UE-specific CG occasion, the RAN may temporarily halt active DRX OFF behavior of neither monitoring nor receiving any uplink channels and may monitor and blindly decode the configured uplink control channel for receiving potential CG re-activation preambles from active CG user equipment devices. (4) On condition of detecting at least a single CG occasion re-activation preamble, the network may instantly and fully halt current operation of one or more next DRX OFF periods while assuming overlapping CG resource occasions are re-activated (e.g., the RAN, may determine to cancel one or more sets of current and near-future DRX OFF periods) (5) During one or more periods of a determined set of cancelled/suspended DRX OFF periods, the RAN may resume all radio reception operations and may attempt decoding of any received uplink payload received during a re-activated CG resource occasion. Accordingly, using embodiments disclosed herein, a RAN may dynamically only trade off some of its network energy saving gains using on-demand activation of DRX OFF periods to facilitate receiving latency-stringent uplink traffic that cannot be further buffered at a user equipment without violating a radio latency quality-of-service requirement corresponding to the traffic.

Figure 2:
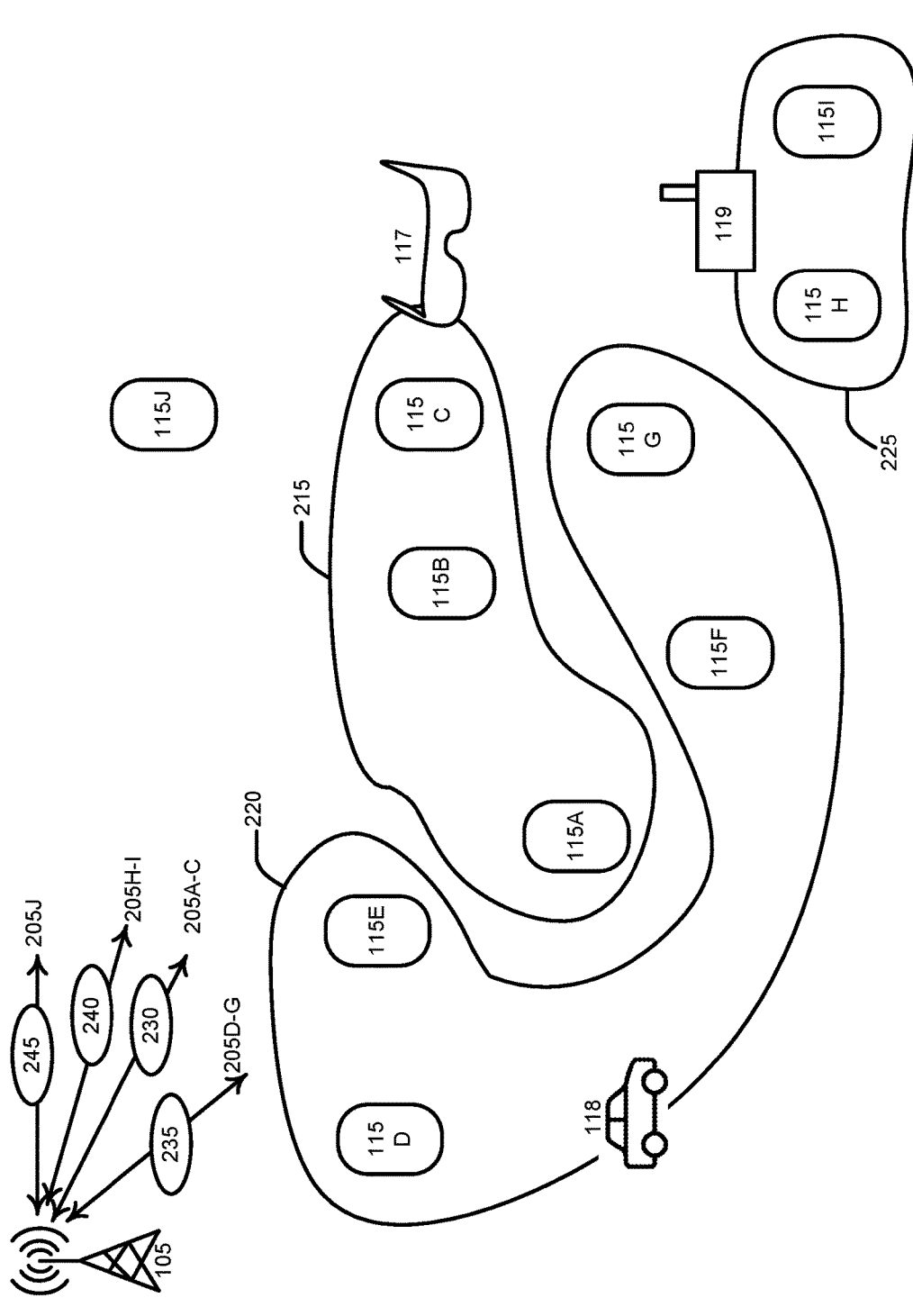
FIG. 2 illustrates an example environment with a radio access network node configuring different user equipment with different configured grant control channel resources to be available during discontinuous reception OFF periods at the radio access network node.

Turning now to FIG. 2, the figure illustrates an example environment 200 with multiple user equipment 115 in multiple user equipment groups 215, 220, and 225. Group 215 may comprise user equipment 115A, 115B, and 115C. User equipment of group 215 may be grouped together because they may operate communication sessions 205A-C that may comprise traffic corresponding to XR sessions, as represented by XR appliance 117 being associated with group 215. Group 220 may comprise user equipment 115D, 115E, 115F, and 115G. User equipment of group 220 may conduct communication sessions 205D-G with radio access network node 105 that comprise traffic to and from one or more vehicles, as represented by vehicle 118 being associated with group 220. Communication session traffic 205D-G with RAN 105 corresponding to one or more vehicles 118 may be sporadic but may be critical when resources are needed to transmit the traffic (e.g., a crash notification). User equipment of group 225 may conduct communication sessions 205H-I with radio access network node 105 that comprise traffic to and from one or more machine-to-machine devices in a factory, as represented by industry icon 119 being associated with group 225. User equipment 115J may conduct a communication session 205J with RAN 105. Traffic corresponding to groups 215, 220, and 225 and traffic corresponding to UE 115J may have different characteristics, such as, for example, different latency requirements, different data rates, different reliability requirements, and the like. Accordingly, radio access network node 105 may configure user equipment 115J, and user equipment of groups 215, 220, and 225 with different configured grant activation configurations 245, 230, 235, and 240, respectively. Configured grant activation configurations 245, 230, 235, and 240 may be indicative of a configured grant control channel resource (e.g., control channel 412 shown in FIG. 4B) to be available during one or more a discontinuous reception OFF period(s) (e.g., periods 410A and 410B shown in FIG. 4B) at the radio access network node. The different configurations 245, 230, 235, and 240 shown in FIG. 2 may be generated and transmitted by RAN 105 based on the different traffic characteristics corresponding to the different user equipment or corresponding to the different user equipment groups. Configurations 245, 230, 235, and 240 may comprise information shown in configuration 500 shown in and described in reference to FIG. 5.

Figure 3:
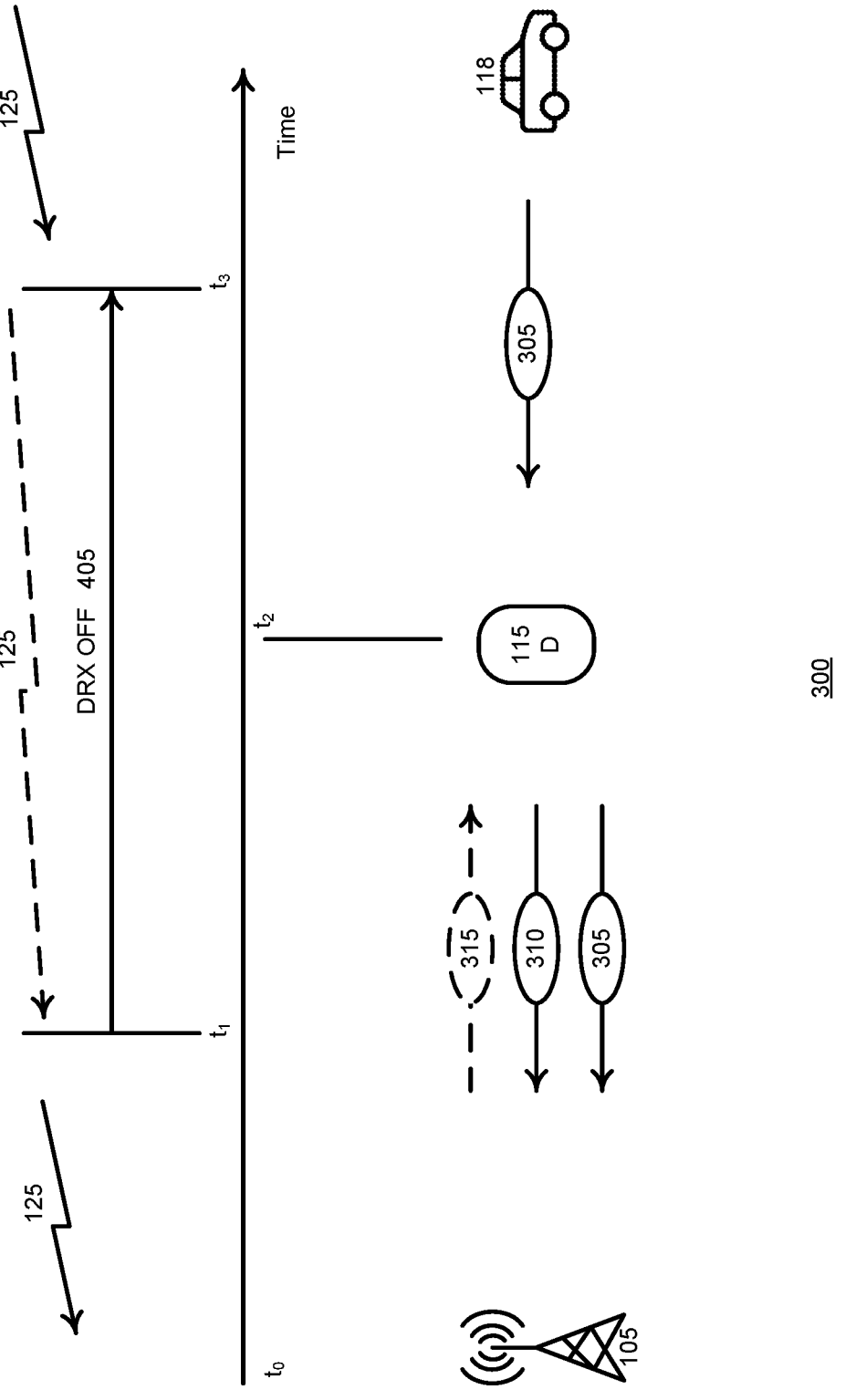
FIG. 3 illustrates traffic to be transmitted to a radio access network node arriving at a user equipment during a discontinuous reception OFF period at the radio access network node.

Turning now to FIG. 3, the figure illustrates environment 300 where user equipment 115D may have a communication session established with radio access network 105 the wireless communication link 125. Radio access network node 105 may be configured to operate a discontinuous reception OFF period 405 between t₁ and t₃. Link 125 is shown pointing toward radio access network node 105 to highlight the receive direction with respect to the radio access network node. However, it will be appreciated that link 125 typically facilitates communication in both directions between user equipment 115 D and radio access network node 105. Moreover, link 125 is rendered with dashed lines in FIG. 3 to indicate receive functionality being deactivated at radio access network node 105 during discontinuous reception OFF period 405.

At t₂ vehicle 118 has urgent traffic 305 to transmit to radio access network node 105. However, due to traffic 305 being available for transmission from user equipment 115D to radio access network 105 at t₂, and t₂ being a time during discontinuous reception OFF period 405, user equipment 115D may transmit to radio access network node 105 a configured grant activation request 310 indicative of at least one protocol data unit corresponding to uplink traffic 305 to be transmitted from the user equipment to the radio access network node. Configured grant activation request 310 may comprise a preamble 505B, or a preamble index 510B described in reference to FIG. 5. Configured grant activation request 310 may be transmitted from user equipment 115D to radio access network node 105 according to resource information contained in a configuration 245, 230, 235, and 240 shown in FIG. 2. For example, a preamble 505B, or a preamble index 510B, may be transmitted from user equipment 115D to radio access network node 105A according to resource information contained in information field 505C of configuration 500 shown in FIG. 5. In an embodiment, RAN 105 may transmit to user equipment 115 a configured grant activation configuration update message 315 according to a configured grant activation configuration update scrambling code shown in field 505A of configuration 500 shown in FIG. 5. The transmitting of configured grant activation configuration update message 315 is shown in dashed lines to indicate that transmission of message 315 may be optional, or at least not required every time UE 115 transmits to RAN 105 a configured grant activation request 310. After transmitting request message 310, UE 115 may transmit traffic 305 to RAN 105 without waiting for a grant or without waiting on a configuration message from the RAN indicating that the RAN has activated one or more configured grant resources during a DRX OFF to receive traffic 305.

Figure 4A:
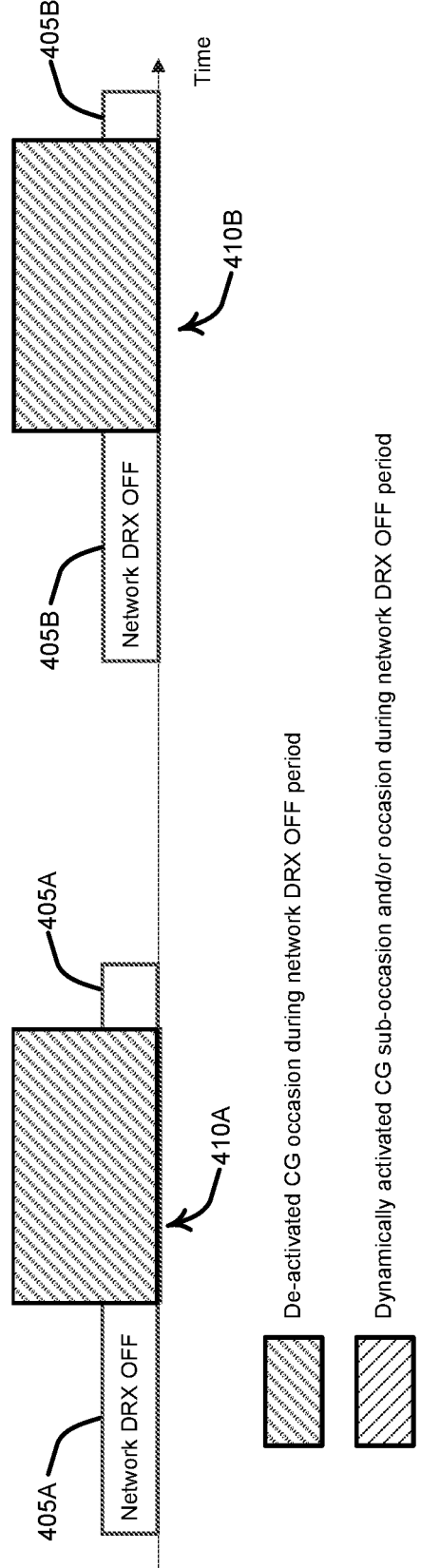
FIG. 4A illustrates a conventional resource diagram of discontinuous reception OFF periods at a radio access network node.

Turning now to FIG. 4A, the figure illustrates, in environment 400, existing/conventional network behavior for handling configured DRX OFF periods. According to conventional 'one-size-fits-all' techniques, during a DRX OFF period 405A or 405B (it will be appreciated that only two period 405 are shown but DRX OFF periods may be configured to repeat until unconfigured), a RAN node typically halts, stops, refrains from, or otherwise deactivates one or more reception functions, including radio receive circuits. Functionality deactivated during a conventional DRX OFF 405 period may comprise detection of uplink traffic signals according to time and frequency resources 410A or 410B otherwise configured for CG uplink traffic that overlap partially or fully with a DRX OFF period. Thus, regardless of urgency of traffic to be transmitted, (e.g., traffic corresponding to an XR appliance with a low latency requirement or traffic from a vehicle related to crash notification or autonomous driving functionality), pre-configured CG occasions 405 that overlap with a DRX OFF period 410 at a RAN node are effectively cancelled/non-existent. If an active user equipment device has critical uplink traffic, which must be transmitted within a limited radio latency budget, to transmit to the RAN node, the next two CG resource occasions are typically overwritten and cancelled due to respective concurrent network DRX OFF periods and the stringent-requirement uplink traffic is buffered until the next available CG occasion (e.g., the next occasion assigned to the user equipment) that does not overlap with active RAN DRX OFF periods, thus leading to potential violation of the stringent latency budget corresponding to the available uplink traffic.

Turning now to FIG. 4B, the figure illustrates CG occasions 410A and 410B that fully or partially overlap with configured network DRX OFF periods 405A and 405B, respectively. An active user equipment, configured via a configuration 245, 230, 235, or 240 shown in FIG. 2 (in an embodiment, configurations 245, 230, 235, and 240 may be generated to comprise information shown in FIG. 5), may indicate, via a preamble or a preamble index configured via the configuration 245, 230, 235, or 240, that urgent uplink traffic has arrived at the user equipment and is ready to be transmitted to the RAN node that is currently operating a DRX OFF period 410. The preamble, or preamble index, may be transmitted as a configured grant activation request 310 shown in FIG. 3, according to resources corresponding to control channel search space 412 shown in FIG. 4B, which resources may be configured via a configuration 245, 230, 235, or 240 shown in FIG. 2. Configured grant activation request 310 may request immediate reactivation of CG occasion resources. As shown in FIG. 4B, CG occasion 410A is deactivated during deactivated portion 411. After receiving configured grant activation request 310 during, and according to, control channel search space 412 resources configured via a configuration 245, 230, 235, or 240 shown in FIG. 2, a RAN may reactivate CG occasion 410A during active portion 413 as shown in FIG. 4B. CG resources corresponding to CG occasion 410 may continue to be active during occasion 410B, which is fully overlapped by next DRX OFF period 405B.

Therefore, after receiving a message 310 during configured CG re-activation control channel 412, a RAN node may override DRX OFF mode period 410A during active portion 413 and during all of active portion 414 of CG occasion 410B. Activation of CG occasions 410A and 410B during DRX OFF periods 405A and 405B may be referred to as 'partial' DRX OFF periods, since DRX OFF periods 405A and 405B may continue after active portions 413 and 414, respectively. During DRX OFF periods, such as DRX OFF periods 405, a RAN node may monitor control channel search space 412 to determine whether at least one CG re-activation preamble has been transmitted in the control channel search space. Upon detecting at least one CG re-activation preamble or indication from one or more active user equipment device(s), a RAN node may override a current DRX OFF functionality deactivation and activate receive functionality during a current CG occasion and/or upcoming one or more CG resource occasions. A configured grant activation request 310 may comprise an indication of a number of CG occasions 410 during which receive functionality at a RAN is to be usable by a user equipment to transmit uplink traffic during otherwise deactivated radio receive functionality during DRX OFF periods. A number of CG occasions to be re-activated by a RAN node after receiving a preamble, or preamble index, in a configured grant activation request 310 may be a design parameter provided by a RAN node as part of radio resource control and/or DCI signaling in a configuration 245, 230, 235, or 240. After transmitting a configured grant activation request 310, a user equipment may 'assume' that previously-cancelled CG occasions have been re-activated and the user equipment may immediately (e.g., without waiting for a grant or without waiting for a confirmation of the CG occasion(s) being activated) transmit the uplink traffic for which the a configured grant activation request 310 was transmitted. In the example depicted in FIG. 4B, a RAN node may have detected during control channel 412 a CG re-activation preamble/configured grant activation request 310 transmitted by an active device (a UE that transmits a request to a RAN may not necessarily be identified in the request) and therefore may activate current CG occasion 410A and next CG occasions 410B and other CG occasion, if any. Thus, as shown in FIG. 4B, a user equipment has two consecutive CG occasion opportunities (e.g., active portions 413 and 414) for transmitting the urgent uplink traffic payload (e.g., traffic payload 305 shown in FIG. 3) that triggered the transmitting of configured grant activation request 310.

Furthermore, the RAN node may further its energy consumption reduction by monitoring CG re-activation/wake up control channel 412 by only partially switching on a receiver chain of the RAN instead of fully switching on all functionality of a receiver chain. Partially switching on a receiver chain may be facilitated by, in an embodiment, control channel 412 being a short duration control channel that is just long enough to carry a single preamble index/indication or preamble. Thus, power heavy blind decoding or full receiver functionality (e.g., with accurate channel estimation, symbol demodulation, etc.) may not be needed.

Moreover, in an embodiment, a RAN node may use ultra-low-power receivers ("ULPR") for receiving and decoding such short duration uplink control channel 412 to result in energy consumed to monitor and detect an indication in control 412 being negligible. To facilitate use of a ULPR to wake up and monitor control channel 412, CG re-activation preambles in a configured grant activation request 310 transmitted via the control channel 412 may be designed for satisfactory detection by the ULPR. For example, a control transmitted via control channel 412 may comprise a set of bits indicative of a request for activation request and may be modulated by on/off keying modulation, instead of more complex modulation schemes, to be receivable or decodable by ULPR that may have minimal processing capability.

Turning now to FIG. 5, the figure illustrates configuration information 500 that may comprise information transmitted in a configured grant activation configuration 245, 230, 235, or 240 (shown in FIG. 2). Downlink control information ("DCI") signaling configuration 500, shown in FIG. 5, may be transmitted from a RAN to one or more active user equipment. The RAN may configure active devices with information elements that may comprise a device-specific and/or device-group scrambling code shown in field 505A, or a scrambling code index shown in field 510A, of configuration 500. The scrambling code, or scrambling code index, may be used by a user equipment to decode a downlink control channel carrying a dynamic CG re-activation configuration (e.g., carrying update message 315 as described in reference to FIG. 3). Since each CG occasion can be either dedicated to a single device and/or to a group of devices, control information update sets can be directed to a single device and/or a single group of devices. Thus, multiple scrambling code groups (device-specific and/or device-group) may be indicated for the intended one or more user equipment device(s) to be able to blindly decode an update message 315 transmitted via a DCI. A RAN may update a number of CG occasions that will be activated during DRX OFF periods responsive to a configured grant activation request based on statistical metrics corresponding to a user equipment or a group of user equipment. For example, if a user equipment tends to request activation of configured grant resources to transmit uplink traffic that is bursty in nature, the RAN may configure, or update a configuration of, a number of configured grant occasions that will be activated during DRX OFF periods based on metrics corresponding to prior uplink traffic transmitted by the user equipment during activated configured grant occasions.

Configuration information 500 may comprise one or more CG occasion re-activation indications 510B and/or preambles 505B. A preamble or sequence code 505B, or preamble index 510B, may be transmitted by an active user equipment to a user equipment, via a configured uplink control channel during a CG occasion of interest (e.g., a CG occasion corresponding to the a time when traffic is available to transmitted by the user equipment to a RAN) to indicate to a RAN node that the user equipment has available an urgent uplink traffic packet ready for immediate transmission. A preamble 505B, or associated index 510B, may be indicative that the user equipment transmitting the preamble, or preamble index, is requesting immediate activation of CG resources that are currently deactivated due to a DRX OFF period at the RAN, and/or activation of the next one or more indicated CG occasions that may be deactivated due to overlap with one or more current DRX OFF periods at the RAN node.

Configuration 500 may comprise uplink control channel resource information 505C for carrying CG re-activation preambles 505B, or preamble indications/indices 510B. resource information 505C may comprise frequency and timing resource information indicative of a CG re-activation control channel search space 412 as shown in FIG. 4B. Control channel search space 412 may be usable by active user equipment devices to carry real-time CG re-activation preambles 505B/indices 510B during a DRX-cancelled CG occasion.

Turning now to FIG. 6, the figure illustrates a timing diagram of an example embodiment 600 to transmit uplink traffic from a user equipment 115 via CG resources activated during a DRX OFF period at a radio access network node 105. At act 605, UE/WTRU 115 may receive configurations of adaptive configured grants (e.g., a configuration such as a configuration 245, 230, 235, or 240 shown in FIG. 2 that may comprise information as described in reference to configuration 500 shown in FIG. 5) that may be scheduled by RAN 105 to occur during network DRX OFF periods at the RAN. Information included in a configuration received at act 605 may comprise (a) an assigned device-specific and/or device-group scrambling code for decoding downlink control channel carrying the respective configurations, (b) a device-specific CG activation preamble indication, (c) timing and/or frequency resources or sub-occasion resource information, usable during one or more or certain DRX OFF periods or occasions, to transmit a CG activation preamble, or preamble index, in, for example, a message 310 shown in FIG. 3.

Continuing with description of FIG. 6, at act 610, UE/WTRU 115 may monitor and blindly decode a downlink control channel based on a configured control channel scrambling code (e.g., field 505A of configuration 500 shown in FIG. 5), and retrieve dynamic configurations (e.g., updates or changes to the configuration received at act 605) corresponding to an adaptive CG, including updated CG activation scrambling indications, which may be referred to as configured grant update scrambling codes. Dynamic configuration information may be transmitted from RAN 105 to UE 115 in a configured grant activation configuration update message 315 described in reference to FIG. 3, and may comprise CG activation sub-occasion scheduling resource information. At act 615, on condition of uplink traffic availability and a device-specific CG occasion fully or partially overlapping an active network DRX OFF period, UE/WTRU may transmit a CG activation preamble (from the configuration received at act 605) via configured CG activation sub-occasion control channel resources (e.g., timing or frequency resources). At act 620, UE/WTRU 115 may transmit payload during a now activated and/or next available and activated CG occasion, despite the CG occasion(s) being fully or partially aligned with DRX OFF periods at RAN 105.

Figure 7:
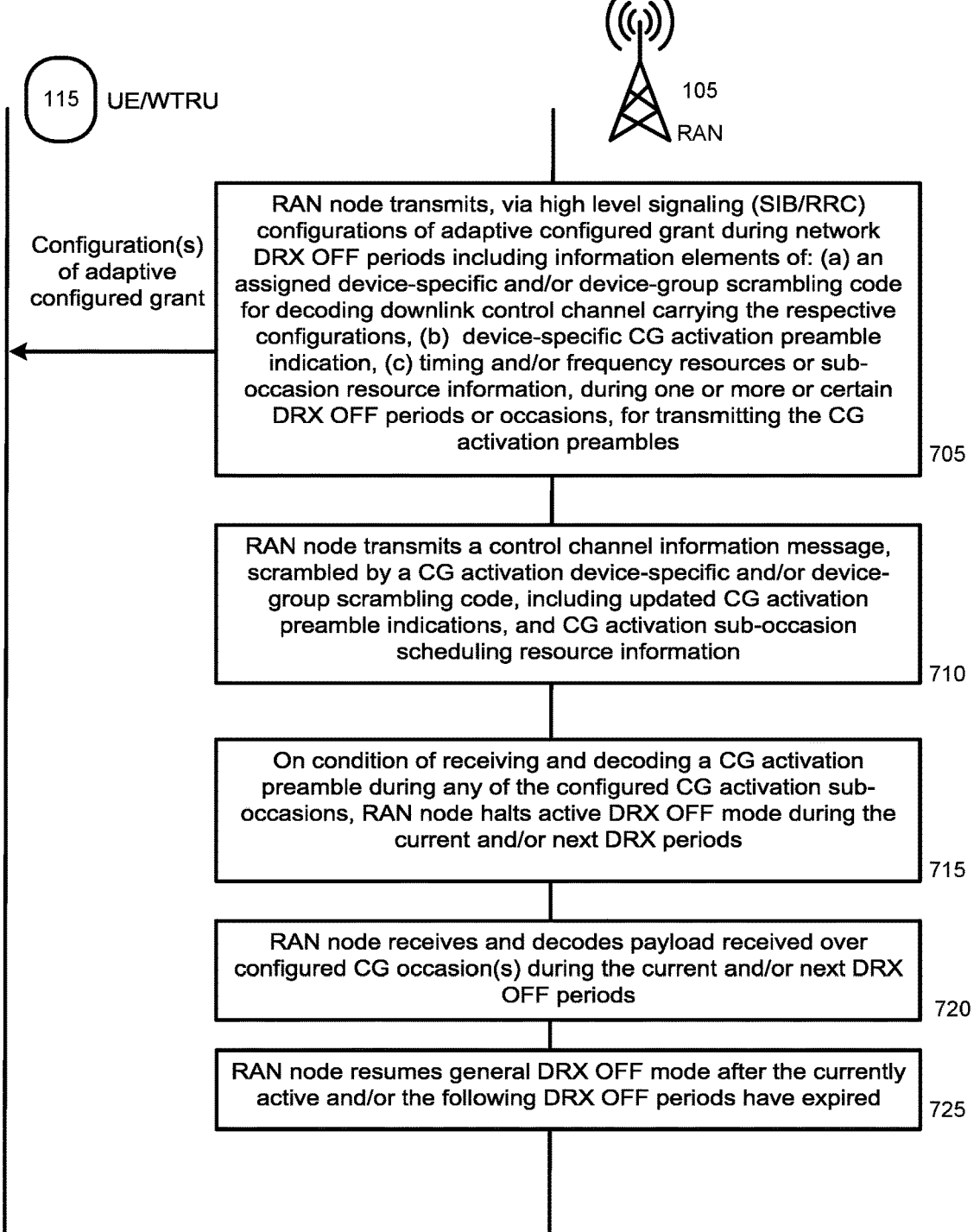
FIG. 7 illustrates a timing diagram of an example embodiment to request and use, during a discontinuous OFF period, uplink resources to transmit uplink traffic during the discontinuous OFF period.

Turning now to FIG. 7, the figure illustrates a timing diagram of an example embodiment 700 to activate, at radio access network node 105, CG resources that have been deactivated during a DRX OFF period at the radio access network node. At act 705, RAN node 105 may transmit to UE 115, via high level signaling (e.g., SIB/RRC) configurations, such as configurations (e.g., configurations 245, 230, 235, or 240 shown in FIG. 2) of adaptive configured grant resources usable during DRX OFF periods at the RAN. Information in configurations transmitted at act 705 may comprise (a) an assigned device-specific and/or device-group scrambling code for decoding a downlink control channel carrying the, (b) a device-specific CG activation preamble indication, (c) information regarding timing and/or frequency resources or sub-occasion resource information, usable during one or more or certain DRX OFF periods or occasions, to transmit CG activation preambles.

At act 710, RAN node 105 may transmit a control channel information message, scrambled by a CG activation device-specific and/or device-group scrambling code, that may comprise updated CG activation preamble indications, and CG activation sub-occasion scheduling resource information. The control information message may be referred to as a configured grant activation configuration update and may be transmitted according to a scrambling code corresponding to UE/WTRU 115, wherein the configured grant activation configuration update comprises an update to the configured grant activation configuration transmitted at act 705. The scrambling code used to transmit the configured grant activation configuration update may be included in field 505A of configuration information 500 described in reference to FIG. 5 and may be transmitted from RAN 105 to UE 115 in a message 315 described in reference to FIG. 3.

Continuing with description of FIG. 7, at act 715, responsive to receiving and decoding at least one CG activation preamble during any of the configured CG activation sub-occasions (e.g., during control channel occasion 412 shown in FIG. 4B), RAN node 105 may suspend operation of DRX OFF mode during the current and/or next number of DRX OFF periods (the number of DRX OFF periods may be indicated in a message that comprises the preamble). At act 720, RAN node 105 may receive from UE/WTRU 115, and decode, payload during a configured CG occasion during a current and/or one or more next DRX OFF periods. At act 725, RAN node 105 may resume a configured DRX OFF mode after the currently active and/or the following DRX OFF periods, during which uplink traffic was received from UE/WTERU 115, have expired.

Figure 8:
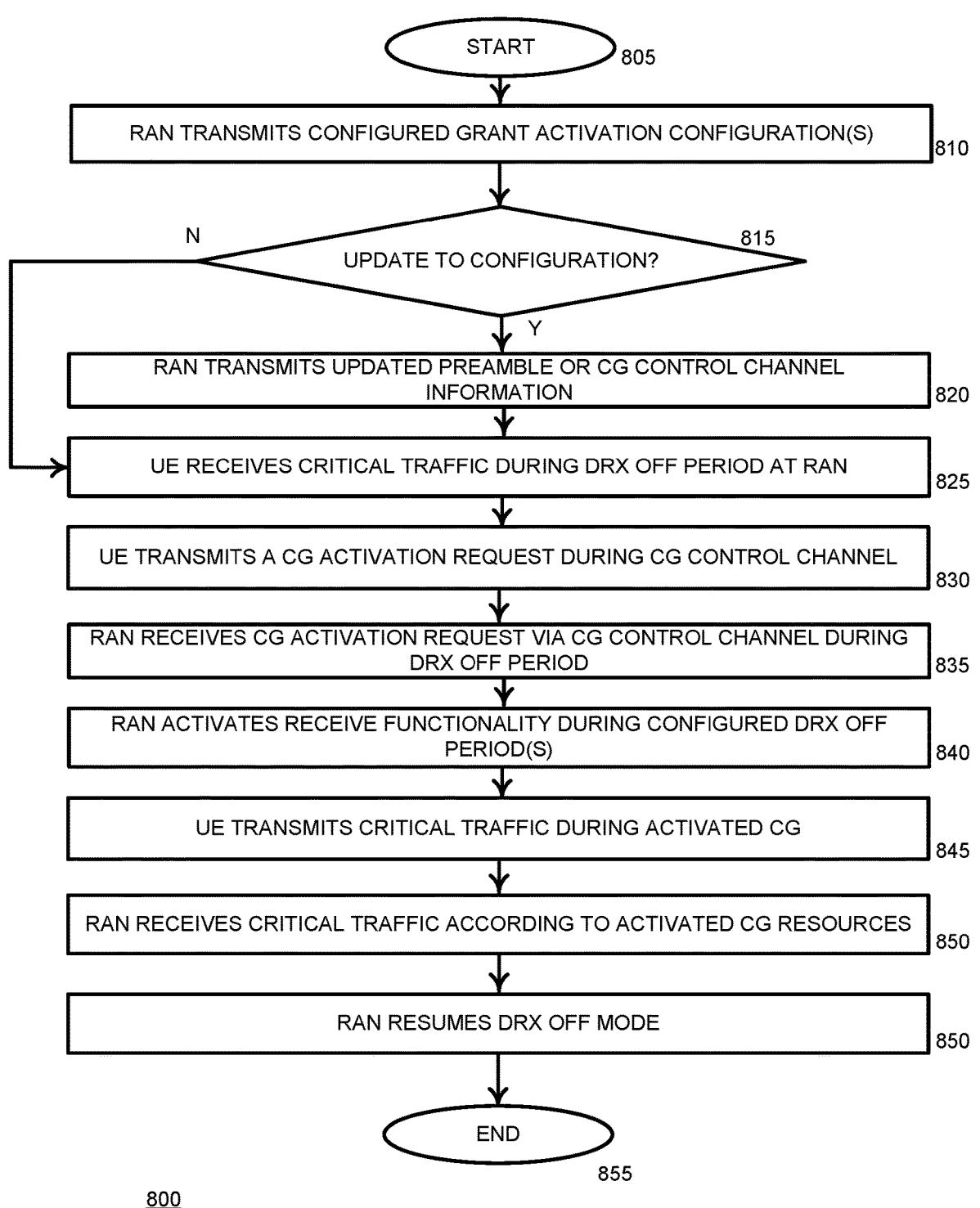
FIG. 8 illustrates a flow diagram of an example embodiment method to request and use, during a discontinuous OFF period, uplink resources to transmit uplink traffic during the discontinuous OFF period.

Turning now to FIG. 8, the figure illustrates an example embodiment method 800 to activate CG resources during a configured DRX OFF period at a radio access network node. Method 800 begins at act 805. At act 810, a radio access network node may transmit one or more configured grant activation configurations, such as, for example, configurations 245, 230, 235, or 240 shown in FIG. 2, that may comprise configuration information such as configuration information 500 shown in FIG. 5. Continuing with description of FIG. 8, at act 815, the radio access network node may determine whether updates to the one or more configurations transmitted to user equipment at act 810 need to be transmitted to the user equipment. If the radio access network node determines that configuration updates need to be transmitted to user equipment, radio access network node may transmit updated configuration information to user equipment at act 820 according to one or more scrambling codes corresponding to the one or more user equipment before method 800 advances to act 825. The configuration(s) transmitted at act 810 may comprise the one or more scrambling codes, which may be user equipment specific or which may be user-equipment-group specific. One or more user equipment may receive and decode the updated configuration information according to one or more scrambling codes corresponding to the one or more user equipment. If a determination is made at act 815 that an update to a configuration transmitted at act 810 is not needed, method 800 advances from act 815 to act 825.

At act 825, a user equipment may receive critical traffic corresponding to an uplink traffic flow during a DRX OFF period at a radio access network node that is serving the user equipment. The user equipment may deem that the traffic is critical based on a latency requirement corresponding to the uplink traffic flow, or based on another criteria, for example the traffic being associated with an emergency notification. The user equipment may have been previously configured to buffer traffic during a DRX OFF period at the radio access network node, but due to the critical nature of the traffic the user equipment may be configured, via a configuration transmitted at act 810, to request activation of a configured grant resource during the DRX OFF period.

At act 830, the user equipment may transmit to the radio access network node a configured grant activation request during a configured grant control channel resource occasion, for example a control channel occasion 412 described in reference to FIG. 4B. The configured grant activation request may comprise a preamble, or a preamble index indicative of a preamble, either of which may have been configured in the user equipment via the configured grant activation configuration transmitted by the RAN at act 810 or via a update message that may have been transmitted by the RAN at act 820.

At act 835, the radio access network node may receive the configuration grant activation request transmitted by the user equipment at act 830 via the configured grant control channel resource occasion during a DRX OFF period at the radio access network node. At act 840, responsive to the configuration grant activation request received at act 835, the radio access network node may activate one or more radio receive functions, or radio receiver functionality, upon receiving the configured grant activation request at act 835. At act 845, the user equipment may transmit the critical traffic, received at act 825, during one or more configured grant occasions activated at act 840, which configured grant occasions the user equipment requested be activated via the configured grant activation request transmitted at act 830. At act 850, the radio access network node may receive critical traffic transmitted by the user equipment at act 845 according to one or more activated configured grant resources that were activated by the radio access network node at act 840 and that, but for the configured grant activation request received by the radio access network at 835, would have been inactive due to a general configured DRX OFF period pattern at the radio access network node. At act 855, the radio access network node may resume DRX OFF mode pattern operation according to the general DRX off configuration. Method 800 advances to act 860 and ends.

Turning now to FIG. 9, the figure illustrates an example embodiment method 900 comprising at block 905 facilitating, by a radio access network node comprising a processor, transmitting, to a user equipment, a configured grant activation configuration indicative of a configured grant control channel resource to be available during a discontinuous reception OFF period at the radio access network node; at block 910 facilitating, by the radio access network node, deactivating at least one radio receive function during the discontinuous reception OFF period; at block 915 facilitating, by the radio access network node during the discontinuous reception OFF period, receiving, according to the configured grant control channel resource, a configured grant activation request indicative of at least one protocol data unit corresponding to an uplink traffic flow to be transmitted from the user equipment to the radio access network node; at block 920 responsive to the configured grant activation request, facilitating, by the radio access network node, activating the at least one radio receive function during the discontinuous reception OFF period to result in at least one activated configured grant resource; and at block 925 facilitating, by the radio access network node, receiving, from the user equipment, the at least one protocol data unit corresponding to the uplink traffic flow according to the at least one activated configured grant resource.

Turning now to FIG. 10, the figure illustrates an example radio access network node, comprising at block 1005 a processor configured to transmit, to at least one user equipment, a configured grant activation configuration indicative of a configured grant control channel resource usable, by the at least one user equipment during scheduled discontinuous reception OFF periods at the radio access network node, to transmit, to the radio access network node, a configured grant activation request; at block 1010 receive, during a discontinuous reception OFF period according to the configured grant control channel resource, a configured grant activation request indicative of at least one protocol data unit corresponding to an uplink traffic flow to be transmitted from the at least one user equipment to the radio access network node; at block 1015 responsive to the configured grant activation request, activate at least one radio receive function during at least one of the scheduled discontinuous reception OFF periods to result in at least one activated configured grant resource; at block 1020 receive the at least one protocol data unit corresponding to the uplink traffic flow according to the at least one activated configured grant resource; and at block 1025 transmit, to the at least one user equipment, a configured grant activation configuration update according to a scrambling code corresponding to the at least one user equipment, wherein the configured grant activation configuration update comprises an update to the configured grant activation configuration.

Turning now to FIG. 11, the figure illustrates a non-transitory machine-readable medium 1100 comprising at block 1105 executable instructions that, when executed by a processor of a radio access network node, facilitate performance of operations, comprising associating one or more user equipment corresponding to a determined quality of service with a quality-of-service group of user equipment; at block 1110 transmitting, to the quality-of-service group of user equipment, a configured grant activation configuration indicative of a configured grant control channel resource usable during a discontinuous reception OFF period at the radio access network node to request activation of at least one receive radio function during one or more discontinuous OFF periods, wherein the configured grant activation configuration comprises a group preamble usable by the quality-of-service group of user equipment to transmit, to the radio access network node, a configured grant activation request indicative of at least one protocol data unit corresponding to an uplink traffic flow to be transmitted from at least one of the user equipment of the quality-of-service group of user equipment to the radio access network node; at block 1115 deactivating the at least one radio receive function during the discontinuous reception OFF period; at block 1120 receiving, according to the configured grant control channel resource, the group preamble from the at least one of the user equipment of the quality-of-service group of user equipment; at block 1125 responsive to the group preamble, activating the at least one radio receive function during at least one discontinuous reception OFF period to result in at least one activated configured grant resource; and at block 1130 receiving, from the at least one of the user equipment of the quality-of-service group of user equipment according to the at least one activated configured grant resource, at least one protocol data unit corresponding to an uplink traffic flow transmitted by the at least one of the user equipment of the quality-of-service group of user equipment.

Figure 12:
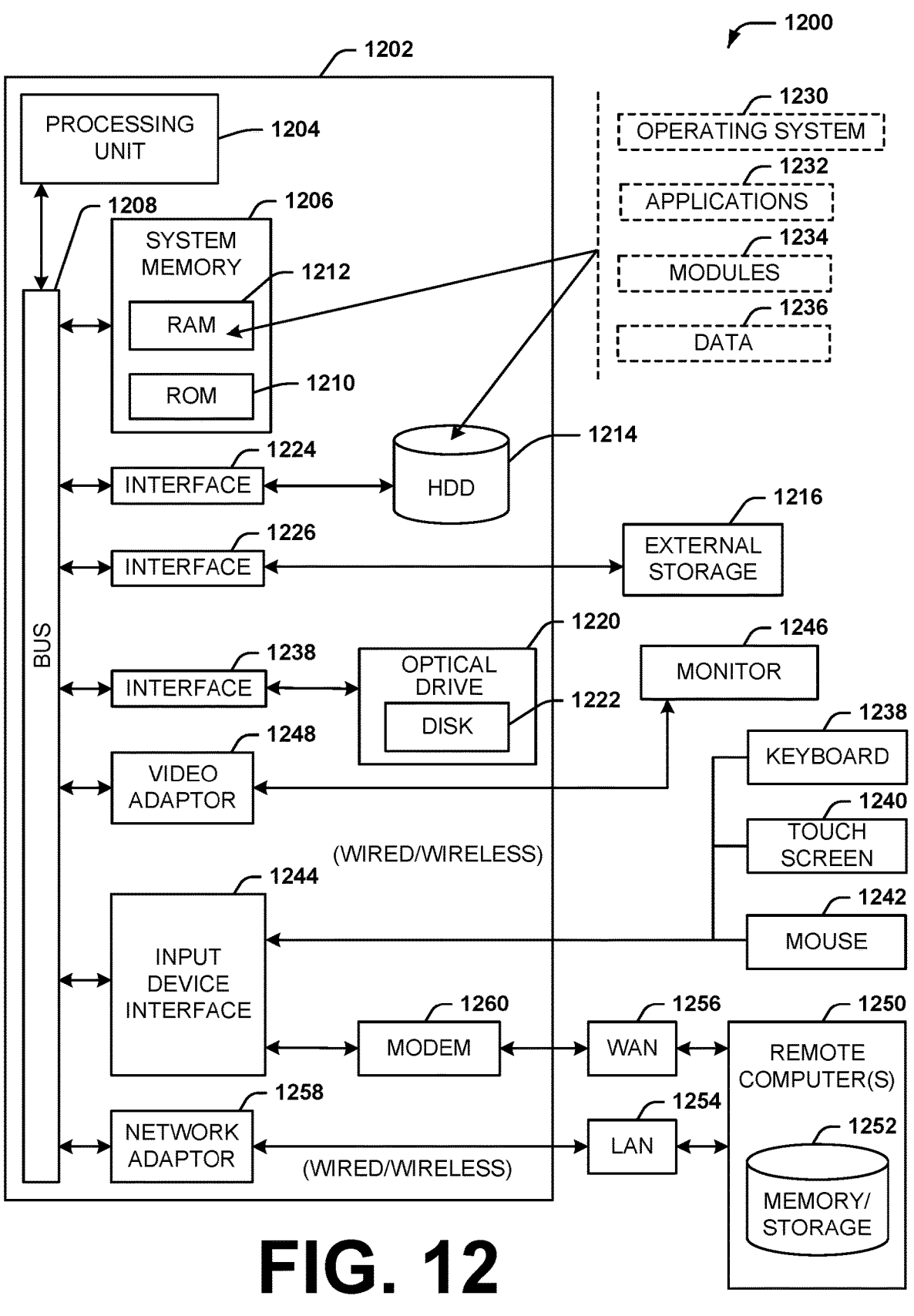
FIG. 12 illustrates an example computer environment.

In order to provide additional context for various embodiments described herein, FIG. 12 and the following discussion are intended to provide a brief, general description of a suitable computing environment 1200 in which various embodiments of the embodiment described herein can be implemented. While embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors and may include a cache memory. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

Computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid-state drive (SSD) could be used in addition to, or in place of, an HDD 1210. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can comprise a security module, such as a trusted processing module (TPM). For instance, with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/ wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/ storage device 1252. It will be appreciated that the network connections shown are examples and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 13:
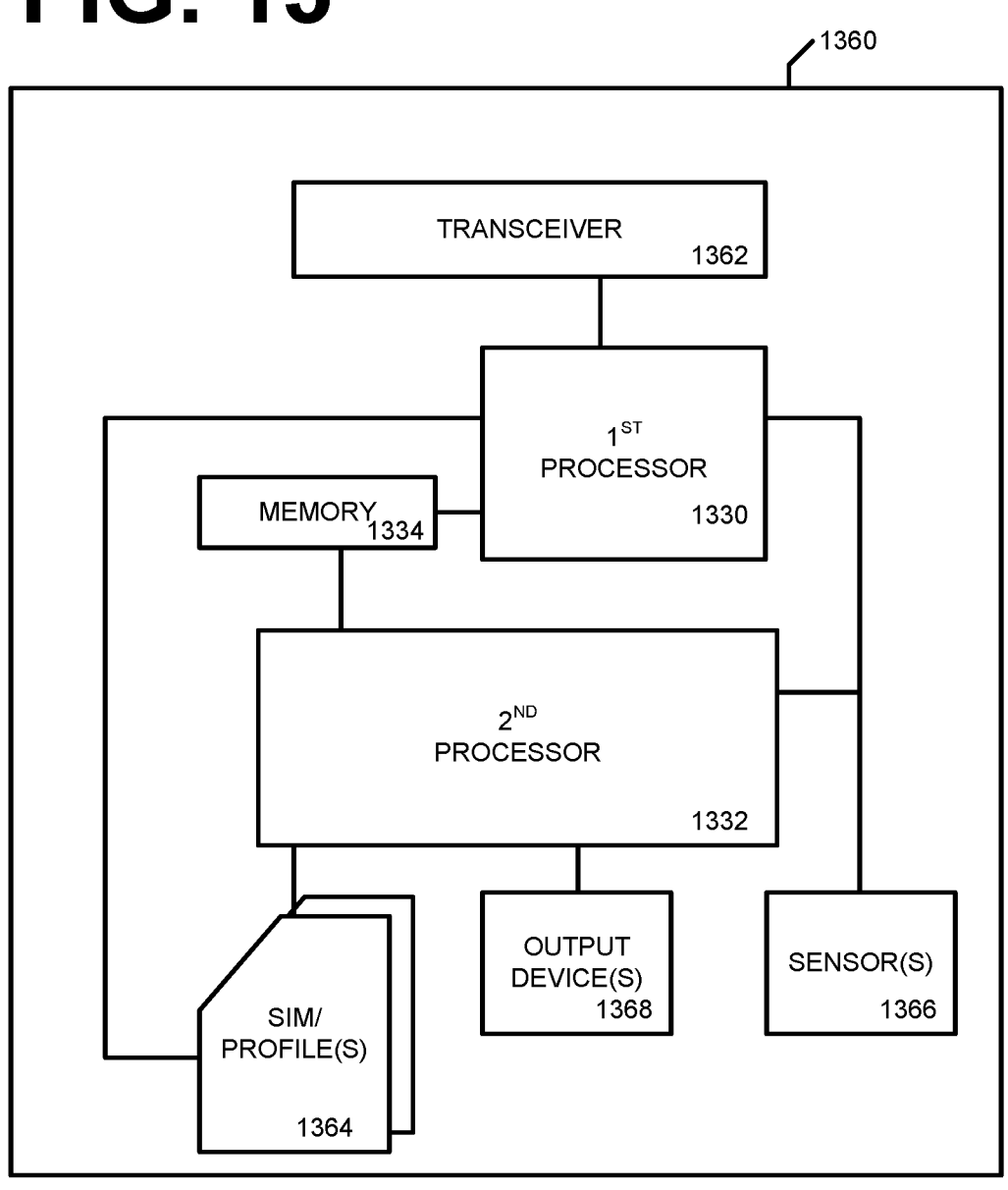
FIG. 13 illustrates a block diagram of an example wireless user equipment.

Turning now to FIG. 13, the figure illustrates a block diagram of an example UE 1360. UE 1360 may comprise a smart phone, a wireless tablet, a laptop computer with wireless capability, a wearable device, a machine device that may facilitate vehicle telematics, and the like. UE 1360 comprises a first processor 1330, a second processor 1332, and a shared memory 1334. UE 1360 includes radio front end circuitry 1362, which may be referred to herein as a transceiver, but is understood to typically include transceiver circuitry, separate filters, and separate antennas for facilitating transmission and receiving of signals over a wireless link, such as one or more wireless links 125, 135, or 137 shown in FIG. 1. Furthermore, transceiver 1362 may comprise multiple sets of circuitry or may be tunable to accommodate different frequency ranges, different modulations schemes, or different communication protocols, to facilitate long-range wireless links such as links, device-to-device links, such as links 135, and short-range wireless links, such as links 137.

Continuing with description of FIG. 13, UE 1360 may also include a SIM 1364, or a SIM profile, which may comprise information stored in a memory (memory 34 or a separate memory portion), for facilitating wireless communication with RAN 105 or core network 130 shown in FIG. 1. FIG. 13 shows SIM 1364 as a single component in the shape of a conventional SIM card, but it will be appreciated that SIM 1364 may represent multiple SIM cards, multiple SIM profiles, or multiple eSIMs, some or all of which may be implemented in hardware or software. It will be appreciated that a SIM profile may comprise information such as security credentials (e.g., encryption keys, values that may be used to generate encryption keys, or shared values that are shared between SIM 1364 and another device, which may be a component of RAN 105 or core network 130 shown in FIG. 1). A SIM profile 1364 may also comprise identifying information that is unique to the SIM, or SIM profile, such as, for example, an International Mobile Subscriber Identity ("IMSI") or information that may make up an IMSI.

SIM 1364 is shown coupled to both the first processor portion 1330 and the second processor portion 1332. Such an implementation may provide an advantage that first processor portion 30 may not need to request or receive information or data from SIM 1364 that second processor 1332 may request, thus eliminating the use of the first processor acting as a 'go-between' when the second processor uses information from the SIM in performing its functions and in executing applications. First processor 1330, which may be a modem processor or baseband processor, is shown smaller than processor 1332, which may be a more sophisticated application processor, to visually indicate the relative levels of sophistication (i.e., processing capability and performance) and corresponding relative levels of operating power consumption levels between the two processor portions. Keeping the second processor portion 1332 asleep/inactive/in a low power state when UE 1360 does not need it for executing applications and processing data related to an application provides an advantage of reducing power consumption when the UE only needs to use the first processor portion 1330 while in listening mode for monitoring routine configured bearer management and mobility management/maintenance procedures, or for monitoring search spaces that the UE has been configured to monitor while the second processor portion remains inactive/asleep.

UE 1360 may also include sensors 1366, such as, for example, temperature sensors, accelerometers, gyroscopes, barometers, moisture sensors, and the like that may provide signals to the first processor 1330 or second processor 1332. Output devices 1368 may comprise, for example, one or more visual displays (e.g., computer monitors, VR appliances, and the like), acoustic transducers, such as speakers or microphones, vibration components, and the like. Output devices 1368 may comprise software that interfaces with output devices, for example, visual displays, speakers, microphones, touch sensation devices, smell or taste devices, and the like, that are external to UE 1360.

The following glossary of terms given in Table 1 may apply to one or more descriptions of embodiments disclosed herein.

TABLE 1

| Term | Definition |
| --- | --- |
| UE | User equipment |
| WTRU | Wireless transmit receive unit |
| RAN | Radio access network |
| QoS | Quality of service |
| DRX | Discontinuous reception |
| DTX | Discontinuous transmission |
| EPI | Early paging indication |
| DCI | Downlink control information |
| SSB | Synchronization signal block |
| RS | Reference signal |
| PDCCH | Physical downlink control channel |
| PDSCH | Physical downlink shared channel |
| MUSIM | Multi-SIM UE |
| SIB | System information block |
| MIB | Master information block |
| eMBB | Enhanced mobile broadband |
| URLLC | Ultra reliable and low latency communications |
| mMTC | Massive machine type communications |
| XR | Anything-reality |
| VR | Virtual reality |
| AR | Augmented reality |
| MR | Mixed reality |
| DCI | Downlink control information |
| DMRS | Demodulation reference signals |
| QPSK | Quadrature Phase Shift Keying |
| WUS | Wake up signal |
| HARQ | Hybrid automatic repeat request |
| RRC | Radio resource control |
| C-RNTI | Connected mode radio network temporary identifier |
| CRC | Cyclic redundancy check |
| MIMO | Multi input multi output |
| UE | User equipment |

TABLE 1-continued

| Term | Definition |
| --- | --- |
| CBR | Channel busy ratio |
| SCI | Sidelink control information |
| SBFD | Sub-band full duplex |
| CLI | Cross link interference |
| TDD | Time division duplexing |
| FDD | Frequency division duplexing |
| BS | Base-station |
| RS | Reference signal |
| CSI-RS | Channel state information reference signal |
| PTRS | Phase tracking reference signal |
| DMRS | Demodulation reference signal |
| gNB | General NodeB |
| PUCCH | Physical uplink control channel |
| PUSCH | Physical uplink shared channel |
| SRS | Sounding reference signal |
| NES | Network energy saving |
| QCI | Quality class indication |
| RSRP | Reference signal received power |
| PCI | Primary cell ID |
| BWP | Bandwidth Part |

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   facilitating, by a radio access network node comprising at least one processor, transmitting, to a user equipment, a configured grant activation configuration indicative of a configured grant control channel resource to be available during a discontinuous reception OFF period at the radio access network node;
   facilitating, by the radio access network node, deactivating at least one radio receive function during the discontinuous reception OFF period;
   facilitating, by the radio access network node during the discontinuous reception OFF period, receiving, according to the configured grant control channel resource, a configured grant activation request indicative of at least one protocol data unit corresponding to an uplink traffic flow to be transmitted from the user equipment to the radio access network node;
   facilitating, by the radio access network node, determining at least one determined traffic characteristic corresponding to the user equipment, wherein the configured grant activation configuration comprises a number of configured grant occasions to be activated during respective discontinuous reception OFF periods based on the at least one determined traffic characteristic;
   responsive to the configured grant activation request, facilitating, by the radio access network node, activating the at least one radio receive function during the discontinuous reception OFF period to result in at least one activated configured grant resource; and
   facilitating, by the radio access network node, receiving, from the user equipment, the at least one protocol data unit corresponding to the uplink traffic flow according to the at least one activated configured grant resource.

2. The method of claim 1, wherein the configured grant activation request comprises a device-specific preamble corresponding to the user equipment.

3. The method of claim 2, wherein the configured grant activation configuration further comprises the device-specific preamble.

4. The method of claim 1, wherein the configured grant activation configuration is transmitted via a radio resource control signal message.

5. The method of claim 1, wherein the configured grant activation configuration comprises a configured grant activation configuration update scrambling code usable by the user equipment to decode updates to the configured grant activation configuration.

6. The method of claim 5, wherein the configuration update scrambling code is specific to the user equipment.

7. The method of claim 5, wherein the user equipment is a member of a group of user equipment, and wherein the configuration update scrambling code is specific to the group of user equipment.

8. The method of claim 1, wherein the at least one radio receive function deactivated during the discontinuous reception OFF period is a first radio receive function, and wherein the facilitating of the receiving of the configured grant activation request comprises facilitating, by the radio access network node, activating a second radio receive function to receive the configured grant activation request.

9. The method of claim 8, wherein activating the second radio receive function comprises activating an ultra-low-power receiver.

10. The method of claim 1, wherein the facilitating of the receiving of the configured grant activation request comprises avoiding blind decoding of the configured grant activation request.

11. The method of claim 1, further comprising:
   facilitating, by the radio access network node, receiving, from the user equipment, a quality-of-service indication indicative of a quality of service corresponding to the uplink traffic flow, wherein the configured grant activation configuration is transmitted to the user equipment based on correspondence of the uplink traffic flow to the quality-of-service.

12. The method of claim 1, wherein the at least one determined traffic characteristic is associated with the uplink traffic flow to be transmitted from the user equipment to the radio access network node.

13. The method of claim 1, wherein the user equipment corresponds to a vehicle.

14. A radio access network node, comprising:
   at least one processor configured to:
   transmit, to at least one user equipment, a configured grant activation configuration indicative of a configured grant control channel resource usable, by the at least one user equipment during scheduled discontinuous reception OFF periods at the radio access network node, to transmit, to the radio access network node, configured grant activation requests;
   receive, during a discontinuous reception OFF period according to the configured grant control channel resource, a configured grant activation request indicative of at least one protocol data unit corresponding to an uplink traffic flow to be transmitted from the at least one user equipment to the radio access network node;
   based on the uplink traffic flow, determine at least one determined traffic characteristic corresponding to the at least one user equipment, wherein the configured grant activation configuration comprises a number of configured grant occasions to be activated during respective discontinuous reception OFF periods based on the at least one determined traffic characteristic;

responsive to the configured grant activation request, activate at least one radio receive function during at least one of the scheduled discontinuous reception OFF periods to result in at least one activated configured grant resource; and receive the at least one protocol data unit corresponding to the uplink traffic flow according to the at least one activated configured grant resource.

15. The radio access network node of claim 14, wherein the at least one processor is further configured to:

transmit, to the at least one user equipment, a configured grant activation configuration update according to a scrambling code corresponding to the at least one user equipment, wherein the configured grant activation configuration update comprises an update to the configured grant activation configuration.

16. The radio access network node of claim 14, wherein the at least one processor is further configured to:

activate an ultra-low-power receiver to receive the configured grant activation request.

17. A non-transitory machine-readable medium, comprising executable instructions that, when executed by at least one processor of a radio access network node, facilitate performance of operations, comprising:

associating one or more user equipment corresponding to a determined quality of service with a quality-of-service group of user equipment;

transmitting, to the quality-of-service group of user equipment, a configured grant activation configuration indicative of a configured grant control channel resource usable during a discontinuous reception OFF period at the radio access network node to request activation of at least one receive radio function during one or more discontinuous OFF periods, wherein the configured grant activation configuration comprises a group preamble usable by the quality-of-service group of user equipment to transmit, to the radio access network node, a configured grant activation request indicative of at least one protocol data unit corresponding to an uplink traffic flow to be transmitted from at least one of the user equipment of the quality-of-service group of user equipment to the radio access network node;

deactivating the at least one radio receive function during the discontinuous reception OFF period;

receiving, according to the configured grant control channel resource, the group preamble from the at least one of the user equipment of the quality-of-service group of user equipment;

responsive to the group preamble, activating the at least one radio receive function during at least one discontinuous reception OFF period to result in at least one activated configured grant resource; and receiving, from the at least one of the user equipment of the quality-of-service group of user equipment according to the at least one activated configured grant resource, at least one protocol data unit corresponding to an uplink traffic flow transmitted by the at least one of the user equipment of the quality-of-service group of user equipment.

18. The non-transitory machine-readable medium of claim 17, wherein the at least one radio receive function is a first radio receive function, the operations further comprising:

activating a second radio receive function to receive the group preamble.

19. The non-transitory machine-readable medium of claim 17, wherein the configured grant activation configuration comprises a group scrambling code usable by the quality-of-service group of user equipment to decode a configured grant activation configuration downlink control channel, and wherein the configured grant activation configuration comprises at least one of: a timing resource, a frequency resources, a determined number of DRX OFF periods, or an occasion resource information element indicative of an uplink control channel resource usable to transmit, by the at least one user equipment of the quality-of-service group of user equipment to the radio access network node, the group preamble during one or more of the determined number of DRX OFF periods.

20. The non-transitory machine-readable medium of claim 19, the operations further comprising:

transmitting, to the quality-of-service group of user equipment, a grant activation configuration update via the configured grant activation configuration downlink control channel according to the group scrambling code, wherein the grant activation configuration update comprises an update to at least one of: the timing resource, the frequency resources, the determined number of DRX OFF periods, or the occasion resource information element indicative of an uplink control channel resource usable to transmit, by the at least one of the user equipment of the quality-of-service group of user equipment to the radio access network node, the group preamble during one or more of the determined number of DRX OFF periods.

* * * * *